United States Patent
Keller et al.

(10) Patent No.: US 6,891,014 B2
(45) Date of Patent: May 10, 2005

(54) OLIGOMERIC HYDROXY ARYLETHER PHTHALONITILES AND SYNTHESIS THEREOF

(75) Inventors: Teddy M. Keller, Fairfax Station, VA (US); Dawn D. Dominguez, Temple Hills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/808,265

(22) Filed: Mar. 17, 2004

(65) Prior Publication Data

US 2004/0181028 A1 Sep. 16, 2004

Related U.S. Application Data

(62) Division of application No. 10/135,012, filed on Apr. 26, 2002, now Pat. No. 6,756,470.

(51) Int. Cl.[7] .................. C08G 65/38; C08G 65/40; C08F 283/38
(52) U.S. Cl. .............. 528/86; 528/154; 528/205; 528/219; 528/397; 528/485; 528/486; 528/488
(58) Field of Search .................. 528/86, 154, 205, 528/219, 397, 485, 486, 488; 525/330.7, 534

(56) References Cited

U.S. PATENT DOCUMENTS 6,756,470 B2 * 6/2004 Keller et al. ............... 528/169

* cited by examiner

Primary Examiner—Duc Truong
(74) Attorney, Agent, or Firm—John J. Karasek; Joseph T. Grunkemeyer

(57) ABSTRACT

An aromatic ether oligomer or polyaromatic ether comprising the formula:

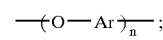

wherein Ar is an independently selected divalent aromatic radical; formed by reacting a dihydroxyaromatic with a dihaloaromatic; and wherein the reaction is performed in the presence of a copper compound and cesium carbonate. The polyaromatic ether is formed when neither the dihydroxyaromatic nor the dihaloaromatic is present in an excess amount. The aromatic ether oligomer is formed by using an excess of either dihydroxyaromatic or dihaloaromatic. A phthalonitrile monomer comprising the formula:

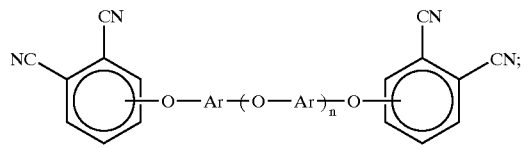

formed by reacting a 3- or 4-nitrophthalonitrile with a hydroxy-terminated aromatic ether oligomer. A thermoset formed by curing the phthalonitrile monomer. Processes for forming all the above.

7 Claims, No Drawings

OLIGOMERIC HYDROXY ARYLETHER PHTHALONITILES AND SYNTHESIS THEREOF

This application is a divisional application of U.S. patent application Ser. No. 10/135,012 filed on Apr. 26, 2002 now U.S. Pat. No. 6,756,470.

BACKGROUND OF THE INVENTION

1. Field of the Invention

The invention relates to polyaromatic ethers, aromatic ether oligomers, phthalonitrile monomers containing aromatic ether oligomer spacers, thermosets made from such phthalonitrile monomers, and processes for making the same.

2. Description of the Prior Art

Phthalonitrile monomers and phthalonitrile polymers of various types are described generally in U.S. Pat. Nos. 3,730,946, 3,763,210, 3,787,475, 3,869,499, 3,972,902, 4,209,458, 4,223,123, 4,226,801, 4,234,712, 4,238,601, 4,259,471, 4,304,896, 4,307,035, 4,315,093, 4,351,776, 4,408,035, 4,409,382, 4,410,676, 5,003,039, 5,003,078, 5,004,801, 5,132,396, 5,159,054, 5,202,414, 5,208,318, 5,237,045, 5,242,755, 5,247,060, 5,292,854, 5,304,625, 5,350,828, 5,352,760, 5,389,441, 5,464,926, 5,925,475, 5,965,268, 6,001,926, and U.S. Pat. No. 6,297,298, all incorporated herein by reference.

The above references generally teach methods for making and polymerizing phthalonitrile monomers. Such monomers typically have two phthalonitrile groups, one at each end of a connecting spacer chain. The monomers can be cured, whereby the cross-linking occurs between cyano groups. These cross-linked networks typically have high thermal and oxidative stability.

Phthalonitrile monomers with aromatic ether oligomeric or polymeric spacers are expected to be useful because they are predicted to have low melting points. Phthalonitrile monomers with a large window between the melting point and the cure temperature are desirable to control the rate of curing and the viscosity during curing.

U.S. Pat. No. 4,259,471 to Keller et al. discloses a phthalonitrile monomer having a polyphenoxy spacer with from 1 to 10 phenyl groups in the spacer chain. The monomer is made by reacting 4-nitrophthalonitrile with an aromatic diol. The aromatic diol is a phenoxy chain with terminal hydroxy groups. The patent states that the aromatic diol can be made by an Ullmann synthesis. However, the patent does not teach how to make the aromatic diol with more than two phenylene groups. It is known in the prior art that an Ullmann synthesis can be used to create a single aromatic ether linkage by reacting a haloaromatic with a hydroxyaromatic in the presence of a stoichiometric amount of a copper complex. There are no known prior reports of the use of an Ullmann synthesis to make an oligomeric or polymeric aromatic ether containing three or more aromatic groups.

U.S. Pat. No. 6,297,298 to Keller et al. recites a phthalonitrile monomer having a polyphenoxy spacer as an embodiment of a general structure. The patent does not disclose any examples of or a process for making this phthalonitrile monomer.

The compound m-bis[m-(m-phenoxyphenoxy)phenoxy]benzene is a commercially available aromatic ether oligomer. There are no other known prior reports of other aromatic ether oligomers.

Marcoux et al., J. Am. Chem. Soc. 1997, 119, 10539, discloses a method for synthesizing a diaryl ether from a haloaromatic and a phenol using a catalytic amount of a copper complex and cesium carbonate. This method does not require the harsh conditions of an Ullmann synthesis such as high temperatures. The method also avoids the use of a stoichiometric amount of copper. The publication does not disclose any use of the method to make an aromatic ether oligomer.

There is need for process to make an aromatic ether oligomer and a polyaromatic ether. The resulting aromatic ether oligomer can then be reacted with a nitrophthalonitrile to make a phthalonitrile monomer. The phthalonitrile monomer can then be cured to form a thermoset.

SUMMARY OF THE INVENTION

It is an object of the invention to provide a polyaromatic ether and an aromatic ether oligomer.

It is a further object of the invention to provide a phthalonitrile monomer with an aromatic ether oligomer spacer.

It is a further object of the invention to provide a thermoset made by curing a phthalonitrile monomer with an aromatic ether oligomer spacer.

These and other objects of the invention are accomplished by process of preparing a polyaromatic ether comprising the formula:

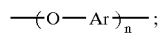

wherein Ar is an independently selected divalent aromatic radical, comprising the step of reacting a dihydroxyaromatic with a dihaloaromatic; wherein neither the dihydroxyaromatic nor the dihaloaromatic is present in an excess amount; and wherein the reaction is performed in the presence of a copper compound and cesium carbonate.

The invention further comprises a process of preparing the above polyaromatic ether comprising the step of reacting a halohydoxyaromatic in the presence of a copper compound and cesium carbonate.

The invention further comprises a process of preparing an aromatic ether oligomer comprising the formula:

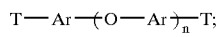

wherein Ar is an independently selected divalent aromatic radical; wherein T is a terminating group independently selected from the group consisting of —OH and —X; wherein X is independently selected from the group consisting of Br and I; and wherein n is an integer greater than or equal to 1; comprising the step of reacting a dihydroxyaromatic with a dihaloaromatic; wherein the reaction is performed in the presence of a copper compound and cesium carbonate; and wherein either the dihydroxyaromatic or the dihaloaromatic is present in an excess amount.

The invention further comprises a process of preparing a phthalonitrile monomer comprising the formula:

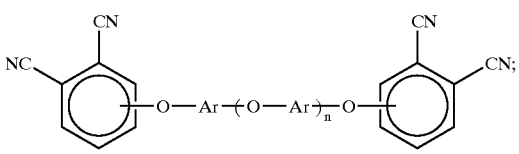

wherein Ar is an independently selected divalent aromatic radical; and wherein n is an even integer greater than or equal to 2; comprising the step of reacting a 3- or 4-nitrophthalonitrile with a hydroxy-terminated aromatic ether oligomer.

The invention further comprises a process of preparing a thermoset comprising the step of curing a mixture comprising the above phthalonitrile monomer.

The invention further comprises the polyaromatic ether, aromatic ether oligomer, phthalonitrile monomer, and thermoset described above.

DETAILED DESCRIPTION OF THE PREFERRED EMBODIMENTS

The synthesis of the thermoset is performed in three steps. First, a dihydroxyaromatic is reacted with a dihaloaromatic to form an aromatic ether oligomer. Second, the aromatic ether oligomer is reacted with a 3- or 4-nitrophthalonitrile to make a phthalonitrile monomer. Third, the phthalonitrile monomer is cured to make a thermoset. Any reference to an ingredient can refer to one embodiment of such ingredient or a combination of one or more embodiments. All polymeric and oligomeric structures claimed include all configurations, isomers, and tacticities of the polymers and oligomers within the scope of the claims. The term "oligomer" as used herein does not place any upper or lower limit on the chain length of the oligomer.

1. Formation of the Aromatic Ether Oligomer

In the first step the dihydroxyaromatic is reacted with the dihaloaromatic to form the polyaromatic ether or the aromatic ether oligomer as shown in formula 1.

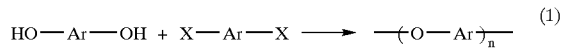

The halo groups, X, on the dihaloaromatic can be iodo or bromo or a combination thereof. Each Ar is an independently selected divalent aromatic radical. The divalent aromatic radical can be any divalent radical with or without substituents containing one or more fused aromatic rings, one or more non-fused aromatic rings with or without intervening functional groups, or combinations thereof wherein the radical sites are on the same or different aromatic rings. 1,3-Phenylene and 1,4-phenylene are typical divalent aromatic radicals. The divalent aromatic radical can be different in each reactant. The divalent aromatic radical can also be different in multiple embodiments of the same reactant. For example, the dihydroxyaromatic can comprise a combination of any of resorcinol (m-dihydroxybenzene), hydroquinone (p-dihydroxybenzene), and any other dihydroxyaromatics. By further example, the dihaloaromatic can comprise a combination of any of m-dibromobenzene, p-dibromobenzene, m-diiodobenzene, p-diiodobenzene, m-bromoiodobenzene, p-bromoiodobenzene, and an other dihaloaromatics.

The aromatic ether oligomer or the polyaromatic ether has a structure that alternates between an aromatic ether functional group containing a divalent aromatic radical from the dihydroxyaromatic and an aromatic ether functional group containing a divalent aromatic radical from the dihaloaromatic.

In one embodiment neither the dihydroxyaromatic nor the dihaloaromatic is present in an excess amount, and the product is a polyaromatic ether. The polyaromatic ether can have a high molecular weight. Typically n is greater than or equal to 7. The polyaromatic ether is not necessarily convertible to a phthalonitrile monomer, but can be useful in other applications. Formula 2 shows the formation of a polyaromatic ether from a 1:1 molar ratio of hydroquinone and p-diiodobenzene. In another embodiment the polyaromatic ether is formed from a halohydroxyaromatic. Formula 3 shows the formation of a polyaromatic ether from 4-iodophenol.

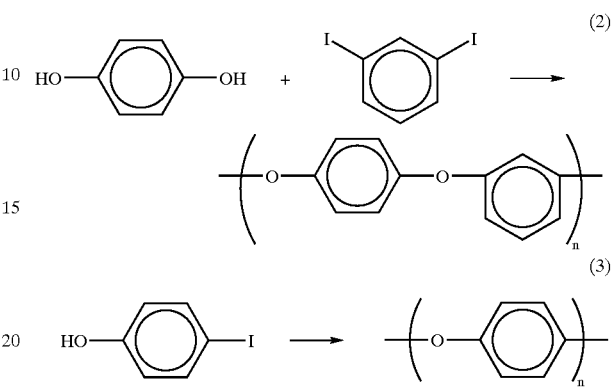

In another embodiment, either the dihydroxyaromatic or the dihaloaromatic is present in an excess amount to form an aromatic ether oligomer. This is shown in formula 4.

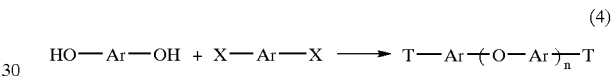

The term n is an integer greater than or equal to 1. Typically, n is less than or equal to 100. More typically, n is equal to 2, 4, 6, or 8. T represents a terminating group. The terminating groups are independently selected from the group consisting of —OH or —X. In some embodiments, the same kind of terminating group is on both ends of the aromatic ether oligomer, although different embodiments of that kind may be found when the terminating group is —X. For example, when the dihaloaromatic is present in an excess amount and is 1-bromo-4-iodobenzene, both terminating groups can be —X, wherein any —X can be either —Br or —I. The process for making the aromatic ether oligomer with each terminating group is discussed separately.

When both terminating groups are —OH, the aromatic ether oligomer is a hydroxy-terminated aromatic ether oligomer. In this case, n is an even integer greater than or equal to 2. The hydroxy groups are bonded to the divalent aromatic radical from the dihydroxyaromatic. This structure is formed when the dihydroxyaromatic is present in an excess amount. When all the dihaloaromatic is consumed, there is still dihydroxyaromatic available to terminate the aromatic ether oligomer. Typically there is sufficient dihydroxyaromatic present to terminate both ends of all aromatic ether oligomeric molecules. If not, in some molecules one terminating group is —OH and the other is —X. Formula 5 shows the general reaction scheme and formula 6 shows the reaction of a 2:1 molar ratio of resorcinol and p-diiodobenzene. Formula 7 shows the reaction of a 2:1 molar ratio of resorcinol and 4,4'-diiodobiphenyl.

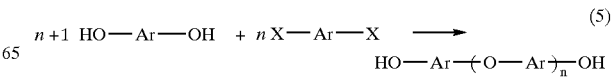

(6)

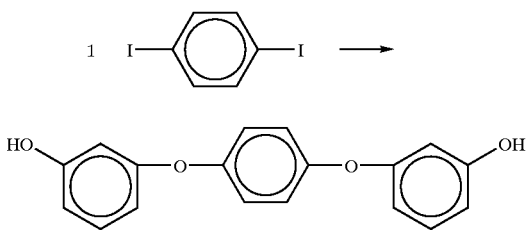

(7)

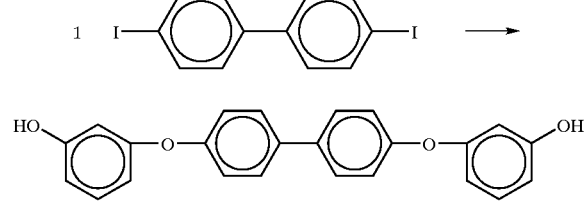

The product in formula 6 represents the average length of the chain. The average length has three units, which corresponds to n=2. There may also be longer chain lengths present as well as unreacted resorcinol. Formula 7 illustrates a divalent aromatic radical with two non-fused aromatic rings. There can also be intervening functional groups between the aromatic rings, such as in bis(4-iodophenyl) methylene.

Formula 8 shows an example using a 3:2 ratio. The dihydroxyaromatic is resorcinol and the dihaloaromatic is a 1:1 molar combination of m-diiodobenzene and p-dibromobenzene. The average chain has five aromatic groups, which corresponds to n=4. Other configurations of the m-phenylene and p-phenylene groups from the dihaloaromatics can also be present as well as molecules with only m-phenylene or only p-phenylene groups from the dihaloaromatics. More than one dihydroxyaromatic can also be used either with a single dihaloaromatic or with more than one dihaloaromatic. Formula 8 shows a 1:1 molar ratio of two dihaloaromatics, however the molar ratios of more than one dihydroxyaromatics or dihaloaromatics can be any desired ratios.

When both terminating groups are —X, the aromatic ether oligomer is a halo-terminated aromatic ether oligomer. In this case, n is an even integer greater than or equal to 2. The halo groups are bonded to the divalent aromatic radical from the dihaloaromatic. The halo-terminated aromatic ether oligomer is made when the dihaloaromatic is present in an excess amount. When all the dihydroxyaromatic is consumed, there is still dihaloaromatic available to terminate the aromatic ether oligomer. Typically there is sufficient dihaloaromatic present to terminate both ends of all aromatic ether oligomer molecules. If not, in some molecules one terminating group is —OH and the other is —X. The same variations of halo-terminated aromatic ether oligomers are possible as for hydroxy-terminated aromatic ether oligomers. Formula 9 shows the general reaction scheme. A 2:1 molar ratio of m-diiodobenzene and hydroquinone would react as in formula 10. The average chain has three aromatic groups, which corresponds to n=2.

$$n+1 \ X\text{—}Ar\text{—}X \ + \ n \ HO\text{—}Ar\text{—}OH \longrightarrow \quad (9)$$
$$X\text{—}Ar\text{—}(O\text{—}Ar)_n\text{—}X$$

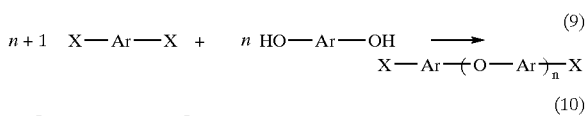

(10)

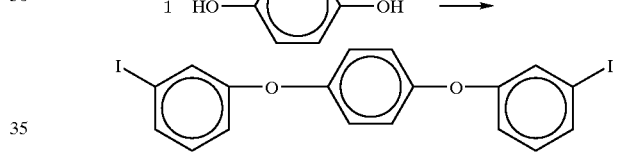

A second way to make a hydroxy-terminated aromatic ether oligomer is to react a halo-terminated aromatic ether oligomer with a dihydroxyaromatic. This dihydroxyaromatic can be the same or different from that used to make the halo-terminated aromatic ether oligomer. This process can be useful for making a hydroxy-terminated aromatic ether oligomer where the aromatic groups at the ends of the chain are different from those in the middle. The dihydroxyaromatic used in this step can also be a combination of dihydroxyaromatics. Formula 11 shows the general reaction scheme. Ar'' is an independently selected divalent aromatic radical. Formula 12 shows the reaction of the product of formula 10 with 1,4-naphthalenediol. 1,4-naphthalenediol is an example of a dihydroxyaromatic having a divalent aromatic radical having two fused aromatic rings.

(8)

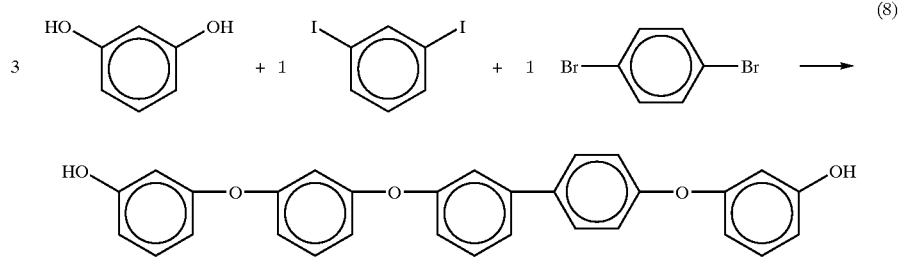

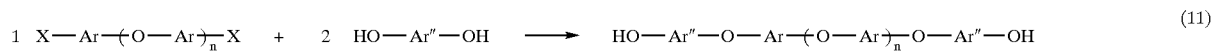

(11)

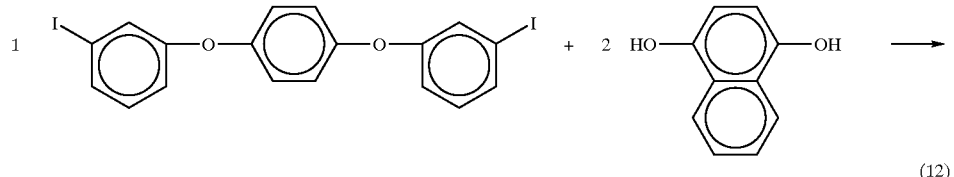

(12)

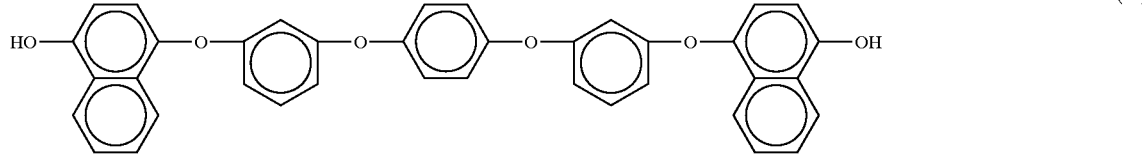

A similar process can be used to form an aryl-terminated aromatic ether oligomer. This aromatic ether oligomer is made by reacting a hydroxy-terminated aromatic ether oligomer with a haloaromatic. The haloaromatic is a monovalent aromatic radical with either a bromo or iodo substituent. The monovalent aromatic radical can be any monovalent radical with or without substituents containing one or more fused aromatic rings, one or more non-fused aromatic rings with or without intervening functional groups, or combinations thereof wherein the radical site is on an aromatic ring. Phenyl is a typical monovalent aromatic radical. Typically, there is only one halo substituent. The haloaromatic can be a combination of haloaromatics. The haloaromatic reacts with the terminal hydroxide groups of the hydroxy-terminated aromatic ether oligomer to produce the aryl-terminated aromatic ether oligomer. Formula 13 shows the general reaction scheme. Formula 14 shows the reaction of the product of formula 6 with iodobenzene.

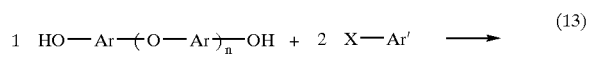

(13)

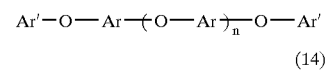

(14)

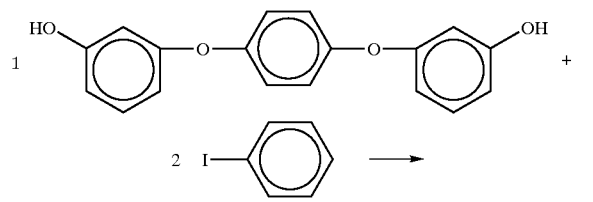

-continued

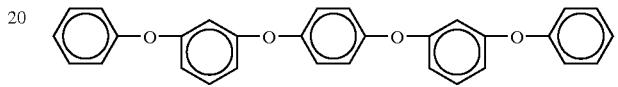

The aryl-terminated aromatic ether oligomer can also be formed by reacting a halo-terminated aromatic ether oligomer with a hydroxyaromatic. The hydroxyaromatic is a monovalent aromatic radical with a hydroxy substituent. The same variations are possible as described in the previous paragraph.

All of the above reactions are performed in the presence of a copper compound and cesium carbonate. Typically the copper compound is CuI or CuBr. Other suitable copper compounds include, but are not limited to, CuCl, $CuBr_2$, and $CuSO_4$. Typically, the dihydroxyaromatic, dihaloaromatic, copper compound, and cesium carbonate are dissolved in solvent and heated. Typically, after the reaction is complete the aromatic ether oligomer can then be precipitated with an aqueous acidic solution. The average molecular weight of the aromatic ether oligomer or the polyaromatic ether is controlled by the ratio of the reactants as described above.

The hydroxy-terminated aromatic ether oligomers can be used to make the phthalonitrile monomers described below, as well as numerous new polymers and compounds through the reaction of the hydroxyl group.

2. Formation of the Phthalonitrile Monomer

In the second step, the hydroxy-terminated aromatic ether oligomer is reacted with 3- or 4-nitrophthalonitrile to make the phthalonitrile monomer. Neither a halo-terminated aromatic ether oligomer nor an aryl-terminated aromatic ether oligomer can be used in this step. Formula 15 shows the general reaction scheme. Formula 16 shows the reaction of the product of formula 6 with 4-nitrophthalonitrile.

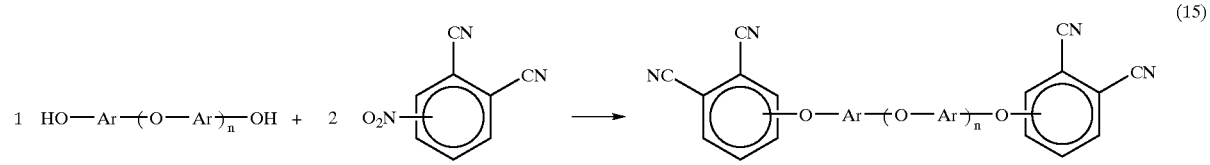

(15)

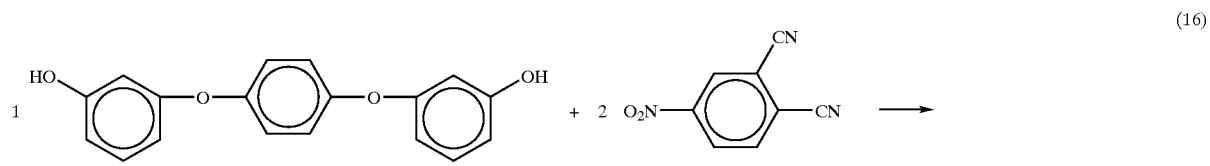

(16)

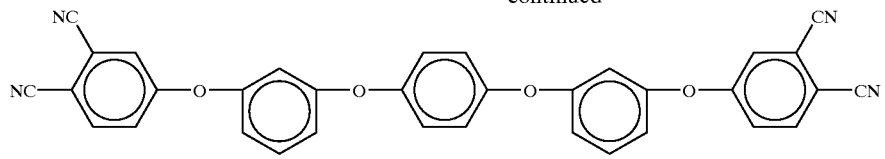

Typically, there is at least a 2:1 molar ratio of 3- or 4-nitrophthalonitrile to hydroxy-terminated aromatic ether oligomer to ensure that all terminal hydroxide groups react with the 3- or 4-nitrophthalonitrile. Any remaining unreacted terminal hydroxide groups can make it more difficult to control the reaction during the curing step. Typically, the hydroxy-terminated aromatic ether oligomer and the 3- or 4-nitrophthalonitrile are dissolved in a solvent and heated in the presence of a base.

The previous step of forming the hydroxy-terminated aromatic ether oligomer typically produces a combination of multiple hydroxy-terminated aromatic ether oligomers (including unreacted dihydroxyaromatic) having an average value of n. This combination can be reacted with the 3- or 4-nitrophthalonitrile to form a combination of phthalonitrile monomers having different values of n. This can result in some phthalonitrile monomers where n is zero.

3. Formation of the Thermoset.

In the final step, a mixture comprising the phthalonitrile monomer is cured to form the thermoset. The cyano groups are the cure sites. As these groups react with each other a cross-linked thermoset is formed. The mixture can comprise multiple phthalonitrile monomers having different values of n. Such a mixture is produced when the phthalonitrile monomers are produced from a combination of hydroxy-terminated aromatic ether oligomers having an average value of n.

The mixture can also comprise 4,4'-bis(3,4-dicyanophenoxy)biphenyl, bis[4-(3,4-dicyanophenoxy)phenyl]dimethylmethane, bis[4-(2,3-dicyanophenoxy)phenyl]dimethylmethane, bis[4-(3,4-dicyanophenoxy)phenyl]-bis(trifluoromethyl)methane, bis[4-(2,3-dicyanophenoxy)phenyl]-bis(trifluoromethyl)methane, 1,3-bis(3,4-dicyanophenoxy)benzene, or 1,4-bis(3,4-dicyanophenoxy)benzene. These compounds are also phthalonitrile monomers. The mixture can also comprise any compound with one or more phthalonitrile groups. Typically, these phthalonitrile compounds have two or more phthalonitrile groups. Such phthalonitrile compounds include, but are not limited to, the phthalonitrile monomers disclosed in the patents cited above. All these compounds can cure with the phthalonitrile monomers of the present invention.

Typically the mixture comprises a curing agent. The curing agent can be any substance useful in promoting the polymerization of the phthalonitrile monomer. More than one curing agent can be used. Typically, the same amount of curing agent can be used as conventionally used in curing analogous prior art monomers. Typically the curing agent is added to a melt of the phthalonitrile monomer with stirring. The mixture is then cured in one or more curing stages. Typical curing temperatures range from about 80° C. to about 500° C. More typically, the range is from 80° C. to about 375° C. Generally, more complete curing occurs at higher temperatures.

Suitable curing agents include, but are not limited to, aromatic amines, primary amines, secondary amines, diamines, polyamines, amine-substituted phosphazenes, phenols, strong acids, organic acids, strong organic acids, inorganic acids, metals, metallic salts, metallic salt hydrates, metallic compounds, halogen-containing aromatic amines, clays, and chemically modified clays. The use of clays or chemically modified clays may improve the mechanical and flammability properties of the thermoset. Typically, chemical modification of a clay involves replacing sodium ions with ammonium to form quarternary ammonium salts.

Specific curing agents include, but are not limited to, bis[4-(4-aminophenoxy)phenyl]sulfone (p-BAPS), bis[4-(3-aminophenoxy)phenyl]sulfone (m-BAPS), 1,4-bis(3-aminophenoxy)benzene (p-APB), 1,12-diaminododecane, diphenylamine, epoxy amine hardener, 1,6-hexanediamine, 1,3-phenylenediamine, 1,4-phenylenediamine, p-toluenesulfonic acid. cuprous iodide, cuprous bromide, 1,3-bis(3-aminophenoxy)benzene (m-APB), 3,3'-dimethyl4,4'-diaminodiphenylsulfone, 3,3'-diethoxy-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diarminobenzophenone, 4,4'-diaminobenzophenone, 3,3'-dimethyl-4,4'-diaminobenzophenone, 3,3'-dimethoxy-4,4'-diaminobenzophenone, 3,3'-dicarboxy-4,4'-diaminobenzophenone, 3,3'-dihydroxy-4,4'-diaminobenzophenone, 3,3'-disulfo4,4'-diaminobenzophenone, 4,4'-diaminodiphenyl ethyl phosphine oxide, 4,4'-diaminodiphenyl phenyl phosphine oxide, bis(3-aminophenoxy-4'-phenyl)phenyl phosphine oxide, methylene dianiline, hexakis(4-aminophenoxy)cyclotriphosphazene, 3,3'-dichloro-4,4'-diaminodiphenylsulfone, 2,2'-bis(trifluoromethyl)-4,4'-diaminobiphenyl, 2,2'-bis(4-aminophenyl)hexafluoropropane, bis[4-(4-aminophenoxy)phenyl]2,2'-hexafluoropropane, 1,1-bis(4-aminophenyl)-1-phenyl-2,2,2-trifluoroethane, 3,3'-dichloro-4,4'-diaminobenzophenone, 3,3'-dibromo-4,4'-diaminobenzophenone, aniline-2-sulfonic acid, 8-aniline-1-naphthalenesulfonic acid, benzene sulfonic acid, butylsulfonic acid, 10-camphorsulfonic acid, 2,5-diaminobenzenesulfonic acid, 6-dimethylamino-4-hydroxy-2-naphthalenesulfonic acid, 5-dimethylamino-1-naphthalenesulfonic acid, 4-hydroxy-3-nitroso-1-naphthalenesulfonic acid tetrahydrate, 8-hydroxyquinoline-5-sulfonic acid, methylsulfonic acid, phenylboric acid, 1-naphthalenesulfonic acid, 2-naphthalenesulfonic acid, 1,5-naphthalenedisulfonic acid, 2,6-naphthalenedisulfonic acid, 2,7-naphthalenedisulfonic acid, picrylsulfonic acid hydrate, 2-pyridineethanesulfonic acid, 4-pyridineethanesulfonic acid, 3-pyridinesulfonic acid, 2-pyridinylhydroxymethanesulfonic acid, sulfanilic acid, 2-sulfobenzoic acid hydrate, 5-sulfosalicylic acid hydrate, 2,4-xylenesulfonic acid, sulfonic acid containing dyes, organic phosphorus-containing acids, phenylphosphinic acid, diphenylphosphinic acid, propylphosphonic acid, 1-aminoethylphosphonic acid, 4-aminophenylphosponic acid, butylphosphonic acid, t-butylphosphonic acid, 2-carboxyethylphosphonic acid, 2-chloroethylphosphonic acid, dimethylphosphonic acid, ethylphosphonic acid, methylenediphosphonic acid, methylphosphonic acid, phosphonoacetic acid, bis(hydroxymethyl) phosphonic acid, chloromethylphosphonic acid, di-n-butylphosphonic acid, dichloromethylphosphonic acid, diphenyldithiophosphonic acid, 1,2-ethylenediphosphonic acid, n-hystaderylphosphonic acid, hydroxymethylphosphonic acid, n-octadecylphosphonic acid, n-octylphosphonic acid, phenylphosphonic acid, propylenediphosphonic acid; n-tetradecylphosphonic acid, concentrated sulfuric acid, phenylphosphonic acid, copper, iron, zinc, nickel, chromium, molybdenum, vanadium, beryllium, silver, mercury, tin, lead, antimony, calcium, barium, manganese, magnesium, cobalt, palladium, platinum, stannous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrates, stannous chloride dihydrate, aluminum nitrate hydrates, aluminum nitrate nonahydrate, triphenylphosphine oxide complex, montmorillonite, and chemically modified montmorillonite.

The invention has the advantage of using a low melting phthalonitrile monomer. As the value of n increases, the processing temperature of the phthalonitrile monomer is shifted to lower temperatures. The low melting point allows the monomer to have a lower viscosity at a given temperature than other phthalonitrile monomers. A low viscosity resin enables composite processing by resin transfer molding, resin infusion methods, and filament winding, without heating the curing mixture to a temperature that initiates curing. Curing can be initiated when the mixture is in position and need not flow any further. Furthermore, a low melt viscosity and a larger processing window are useful for fabrication of thick composite sections where the melt must impregnate thick fiber preforms. The curing mixture viscosity is a function of both the curing agent concentration and the melt temperature. Thus, low melting phthalonitrile monomers and curing agents that do not volatilize at elevated cure temperatures can enhance the processability of phthalonitrile-based composites. This is important since most high temperature resins are not amenable to processing by cost effective methods such as resin transfer molding, resin infusion molding, filament winding, and oven cure due to high initial viscosities, the evolution of volatiles during the cure, and solvent-related problems.

The thermoset has the advantage of very desirable thermo-oxidative properties, which may be unaffected by the nature of the curing agent. The thermoset also has improved physical properties, such as toughness and processability, relative to systems with a short spacer between the terminal phthalonitrile moieties. Generally, toughness and brittleness are improved with lower cross-link densities. This can be achieved by using phthalonitrile monomers with longer spacer chains.

Having described the invention, the following examples are given to illustrate specific applications of the invention. These specific examples are not intended to limit the scope of the invention described in this application.

A. Synthesis of Aromatic Ether Oligomer

EXAMPLE 1

Synthesis of hydroxy-terminated aromatic ether oligomer (n=2) from resorcinol and m-diiodobenzene with copper (I) iodide—To a 100 mL, 3-neck flask fitted with a thermometer, a Dean-Stark trap, a water-cooled condenser and an argon inlet were added 2.2 g (20.0 mmol) of resorcinol, 3.3 g (10.0 mmol) of m-diiodobenzene, 6.5 g (20.0 mmol) of cesium carbonate, 0.1 g (0.5 mmol) copper (I) iodide, 13 mL of N,N-dimethylformamide (DMF), 7 mL of toluene, and 0.1 mL of ethyl acetate. The Dean-Stark trap was filled with toluene. The reaction mixture was refluxed at 126–127° C. under argon for 23 hours. During this time, water formed as a byproduct was removed from the reaction mixture by azeotropic distillation. The progress of the reaction was monitored by FTIR spectroscopy. When complete conversion to the hydroxy-terminated aromatic ether oligomer was indicated by FTIR, refluxing was stopped and toluene was removed from the reaction mixture by distillation. When the temperature of the reaction mixture reached 150° C., it was assumed that all the toluene had been removed. The reaction mixture was then cooled to room temperature. After cooling, the mixture was poured into 5% sodium hydroxide and extracted 5 times with diethyl ether to remove residual solvents. The aqueous layer was made acidic with concentrated hydrochloric acid. The solid precipitate that formed was extracted by washing 3 times with diethyl ether. The ether extracts were separated, dried over sodium sulfate, filtered, and solvent was removed by vacuum under ambient conditions. The vacuum dried hydroxy-terminated aromatic ether oligomer weighed 3.0 g (100%).

EXAMPLE 2

Synthesis of hydroxy-terminated aromatic ether oligomer (n=4) from resorcinol and m-diiodobenzene with copper (I) iodide—To a 100 mL, 3-neck flask fitted with a thermometer, a Dean-Stark trap, a water-cooled condenser and an argon inlet were added 3.3 g (30.0 mmol) of resorcinol, 6.6 g (20.0 mmol) of m-diiodobenzene, 9.8 g (30.0 mmol) of cesium carbonate, 0.2 g (1.0 mmol) copper (I) iodide, 13 mL of N,N-dimethylformamide (DMF), 7 mL of toluene, and 0.1 mL of ethyl acetate. The Dean-Stark trap was filled with toluene. The reaction mixture was refluxed at 126–127° C. under argon for 26 hours. During this time, water formed as a byproduct was removed from the reaction mixture by azeotropic distillation. The progress of the reaction was monitored by FTIR spectroscopy. When complete conversion to the hydroxy-terminated aromatic ether oligomer was indicated by FTIR, refluxing was stopped and toluene was removed from the reaction mixture by distillation. When the temperature of the reaction mixture reached 150° C., it was assumed that all the toluene had been removed. The reaction mixture was then cooled to room temperature. After cooling, the mixture was poured into 5% sodium hydroxide and extracted 5 times with diethyl ether to remove residual solvents. The aqueous layer was made acidic with concentrated hydrochloric acid. The solid precipitate that formed was extracted by washing 3 times with diethyl ether. The ether extracts were separated, dried over sodium sulfate, filtered, and solvent was removed by vacuum under ambient conditions. The vacuum dried hydroxy-terminated aromatic ether oligomer weighed 3.3 g (69%).

EXAMPLE 3

Synthesis of hydroxy-terminated aromatic ether oligomer (n=8) from resorcinol and m-diiodobenzene with copper (I) iodide—To a 100 mL, 3-neck flask fitted with a thermometer, a Dean-Stark trap, a water-cooled condenser and an argon inlet were added 2.2 g (20.0 mmol) of resorcinol, 5.3 g (16.0 mmol) of m-diiodobenzene, 6.5 g (20.0 mmol) of cesium carbonate, 0.2 g (0.8 mmol) copper (I) iodide, 13 mL of N,N-dimethylformamide (DMF), 5 mL of toluene, and 0.1 mL of ethyl acetate. The Dean-Stark trap was filled with toluene. The reaction mixture was refluxed at 130–131° C. under argon for 19 hours. During this time, water formed as a byproduct was removed from the reaction mixture by azeotropic distillation. The progress of the reaction was monitored by FTIR spectroscopy. When complete conversion to the hydroxy-terminated aromatic ether oligomer was indicated by FTIR, refluxing was stopped and toluene was removed from the reaction mixture by distillation. When the temperature of the reaction mixture reached 150° C., it was assumed that all the toluene had been removed. The reaction mixture was then cooled to room temperature. After cooling, the mixture was poured into 5% sodium hydroxide and extracted 5 times with diethyl ether to remove residual solvents. The aqueous layer was made acidic with concentrated hydrochloric acid. The solid precipitate that formed was extracted by washing 3 times with diethyl ether. The ether extracts were separated, dried over sodium sulfate, filtered, and solvent was removed by vacuum under ambient conditions. The vacuum dried hydroxy-terminated aromatic ether oligomer weighed 2.0 g (59%).

EXAMPLE 4

Synthesis of hydroxy-terminated aromatic ether oligomer (n=2) from resorcinol and m-dibromobenzene with copper (I) iodide—To a 100 mL, 3-neck flask fitted with a thermometer, a Dean-Stark trap, a water-cooled condenser and an argon inlet were added 1.1 g (10.0 mmol) of resorcinol, 1.2 g (5.0 mmol) of m-dibromobenzene, 0.05 g (0.25 mmol) copper (I) iodide, 20 mL of N,N-dimethylformamide (DMF) and 10 mL of toluene. The Dean-Stark trap was filled with toluene. The reaction mixture was refluxed at 130–131° C. ° C. under argon for 6 hours. During the first several hours of reflux, 8.2 g (25.0 mmol) of pulverized cesium carbonate was added in four portions and water formed as a byproduct was removed from the reaction mixture by azeotropic distillation. The progress of the reaction was monitored by FTIR spectroscopy. When complete conversion to the hydroxy-terminated aromatic ether oligomer was indicated by FTIR, refluxing was stopped and toluene was removed from the reaction mixture by distillation. When the temperature of the reaction mixture reached 150° C., it was assumed that all the toluene had been removed. The reaction mixture was then cooled to room temperature. After cooling, the reaction mixture was poured into 5% sodium hydroxide and the solution was filtered to remove residual copper (I) iodide. The solution was then made acidic with concentrated hydrochloric acid. The solid precipitate that formed was extracted by washing 3 times with diethyl ether. The ether extracts were separated, dried over sodium sulfate, filtered, and solvent was removed by vacuum under ambient conditions. The vacuum dried hydroxy-terminated aromatic ether oligomer weighed 1.4 g (93%).

EXAMPLE 5

Synthesis of hydroxy-terminated aromatic ether oligomer (n=2) from resorcinol and p-dibromobenzene with copper (I) iodide—To a 100 mL, 3-neck flask fitted with a thermometer, a Dean-Stark trap, a water-cooled condenser and an argon inlet were added 1.1 g (10.0 mmol) of resorcinol, 1.2 g (5.0 mmol) of p-dibromobenzene, 0.05 g (0.25 mmol) copper (I) iodide, 13 mL of N,N-dimethylformamide (DMF) and 3 mL of toluene. The Dean-Stark trap was filled with toluene. The reaction mixture was refluxed at 137–140° C. ° C. under argon for 8 hours. During the first several hours of reflux, 8.2 g (25.0 mmol) of pulverized cesium carbonate was added in four portions and water formed as a byproduct was removed from the reaction mixture by azeotropic distillation. The progress of the reaction was monitored by FTIR spectroscopy. When complete conversion to the hydroxy-terminated aromatic ether oligomer was indicated by FTIR, refluxing was stopped and toluene was removed from the reaction mixture by distillation. When the temperature of the reaction mixture reached 150° C., it was assumed that all the toluene had been removed. The reaction mixture was then refluxed at 150° C. for an additional 4 hours before cooling to room temperature. After cooling, the reaction mixture was poured into 5% sodium hydroxide and the solution was filtered to remove residual copper (I) iodide. The solution was then made acidic with concentrated hydrochloric acid. The solid precipitate that formed was extracted by washing 3 times with diethyl ether. The ether extracts were separated, dried over sodium sulfate, filtered, and solvent was removed by vacuum under ambient conditions. The vacuum dried hydroxy-terminated aromatic ether oligomer weighed 1.1 g (73%).

EXAMPLE 6

Synthesis of hydroxy-terminated aromatic ether oligomer (n=2) from resorcinol and m-dibromobenzene with copper (I) bromide—To a 100 mL, 3-neck flask fitted with a thermometer, a Dean-Stark trap, a water-cooled condenser and an argon inlet were added 1.1 g (10.0 mmol) of resorcinol, 1.2 g (5.0 mmol) of m-dibromobenzene, 0.04 g (0.25 mmol) copper (I) bromide, 20 mL of N,N-dimethylformamide (DMF) and 10 mL of toluene. The Dean-Stark trap was filled with toluene. The reaction mixture was refluxed at 130–131° C. ° C. under argon for 7 hours. During the first several hours of reflux, 8.2 g (25.0 mmol) of pulverized cesium carbonate was added in four portions and water formed as a byproduct was removed from the reaction mixture by azeotropic distillation. The progress of the reaction was monitored by FTIR spectroscopy. When complete conversion to the hydroxy-terminated aromatic ether oligomer was indicated by FTIR, refluxing was stopped and toluene was removed from the reaction mixture by distillation. When the temperature of the reaction mixture reached 150° C., it was assumed that all the toluene had been removed. The reaction mixture was then cooled to room temperature. After cooling, the reaction mixture was poured into 5% sodium hydroxide and the solution was filtered to remove residual copper (I) bromide. The solution was then made acidic with concentrated hydrochloric acid. The solid precipitate that formed was extracted by washing 3 times with diethyl ether. The ether extracts were separated, dried over sodium sulfate, filtered, and solvent was removed by vacuum under ambient conditions. The vacuum dried hydroxy-terminated aromatic ether oligomer weighed 1.4 g (93%).

EXAMPLE 7

Synthesis of hydroxy-terminated aromatic ether oligomer (n=2) from resorcinol and p-dibromobenzene with copper (I) bromide—To a 100 mL, 3-neck flask fitted with a thermometer, a Dean-Stark trap, a water-cooled condenser and an argon inlet were added 1.1 g (10.0 mmol) of resorcinol, 1.2 g (5.0 mmol) of m-dibromobenzene, 0.04 g (0.25 mmol) copper (I) bromide, 20 mL of N,N- dimethylformamide (DMF) and 10 mL of toluene. The Dean-Stark trap was filled with toluene. The reaction mixture was refluxed at 130–131° C. ° C. under argon for 7 hours. During the first several hours of reflux, 8.2 g (25.0 mmol) of pulverized cesium carbonate was added in four portions and water formed as a byproduct was removed from the reaction mixture by azeotropic distillation. The progress of the reaction was monitored by FTIR spectroscopy. When complete conversion to the hydroxy-terminated aromatic ether oligomer was indicated by FTIR, refluxing was stopped and toluene was removed from the reaction mixture by distillation. When the temperature of the reaction mixture reached 150° C., it was assumed that all the toluene had been removed. The reaction mixture was then cooled to room temperature. After cooling, the reaction mixture was poured into 5% sodium hydroxide and the solution was filtered to remove residual copper (I) bromide. The solution was then made acidic with concentrated hydrochloric acid. The solid precipitate that formed was extracted by washing 3 times with diethyl ether. The ether extracts were separated, dried over sodium sulfate, filtered, and solvent was removed by vacuum under ambient conditions. The vacuum dried hydroxy-terminated aromatic ether oligomer weighed 1.3 g (87%).

EXAMPLE 8

Synthesis of m-bis[m-(m-phenoxyphenoxy)phenoxy] benzene aryl-terminated aromatic ether oligomer from hydroxy-terminated aromatic ether oligomer (n=4)—To a 25 mL, 3-neck flask fitted with a thermometer, a Dean-Stark trap, a water-cooled condenser and an argon inlet were added 0.5 g (1.0 mmol) of the 3:2 hydroxy-terminated aromatic ether oligomer prepared as in Example 2, 0.4 g (2.0 mmol) of iodobenzene, 0.3 g (1.0 mmol) of cesium carbonate, 0.02 g (0.1 mmol) copper (I) iodide, 7 mL of N,N-dimethylformamide (DMF), 3.5 mL of toluene, and 0.06 mL of ethyl acetate. The Dean-Stark trap was filled with toluene. The reaction mixture was refluxed at 128° C. under argon for 129 hours. During this time, water was removed from the reaction mixture by azeotropic distillation. The progress of the reaction was monitored by FTIR spectroscopy. When complete conversion to the aryl-terminated aromatic ether oligomer was indicated by FTIR, refluxing was stopped and the toluene was removed by distillation. When the temperature of the reaction mixture reached 150° C., it was assumed that the toluene had been removed. The reaction mixture was then cooled to room temperature. After cooling, the mixture was poured into 5% sodium hydroxide and extracted 3 times with methylene chloride. The methylene chloride layer was separated, dried over sodium sulfate, filtered, and solvent was removed by vacuum under ambient conditions. The vacuum dried aryl-terminated aromatic ether oligomer weighed 0.13 g (21%).

EXAMPLE 9

Synthesis of m-bis[m-(m-phenoxyphenoxy)phenoxy] benzene aryl-terminated aromatic ether oligomer in one step from resorcinol and m-diiodobenzene with copper (I) iodide—To a 15 mL, 3-neck flask fitted with a thermometer, a Dean-Stark trap, a water-cooled condenser and an argon inlet were added 0.6 g (5.0 mmol) resorcinol, 1.1 g (3:3 mmol) of m-diiodobenzene, 1.6 g (5.0 mmol) of cesium carbonate, 0.03 g (0.2 mmol) copper (I) iodide, 3.5 mL of N,N-dimethylformamide (DMF), 2.0 mL of toluene, and 0.03 mL of ethyl acetate. The Dean-Stark trap was filled with toluene. The reaction mixture was refluxed at 125° C. under argon for 22 hours. During this time, water was removed from the reaction mixture by azeotropic distillation. The progress of the reaction was monitored by FTIR spectroscopy. When complete conversion to hydroxy-terminated aromatic ether oligomer was indicated by FIR, the reaction mixture was cooled to room temperature and 0.7 g (3.3 mmol) of iodobenzene were added to the reaction flask. After the addition, the reaction mixture was again brought to reflux and the second reaction was allowed to proceed for 17 hours while the progress of the reaction was monitored by FTIR spectroscopy. When complete conversion to aryl-terminated aromatic ether oligomer was indicated by FTIR, the toluene was removed by distillation. When the temperature of the reaction mixture reached 150° C., it was assumed that the toluene had been removed. The reaction mixture was then cooled to room temperature. After cooling, the mixture was poured into 5% sodium hydroxide and extracted 3 times with methylene chloride. The methylene chloride layer was separated, dried over sodium sulfate, filtered, and solvent was removed by vacuum under ambient conditions. The vacuum dried aryl-terminated aromatic ether oligomer weighed 0.4 g (44%).

B. Synthesis of Phthalonitrile Monomer

EXAMPLE 10

Synthesis phthalonitrile monomer (n=2)—To a 50 mL, 3-neck flask fitted with a thermometer, a Dean-Stark trap, a water-cooled condenser and an argon inlet were added 3.0 g (10.4 mmol) of the 2:1 hydroxy-terminated aromatic ether oligomer prepared as in Example 1, 15 mL dimethyl sulfoxide (DMSO), and 5 mL toluene. The Dean-Stark trap was filled with toluene. The reaction mixture was refluxed at 140° C. under argon for 4 hours. Anhydrous, pulverized potassium carbonate 5.8 g (41.7 mmol) was then added to the reaction mixture in 4 equal portions over 4 hours while continuing the reflux. During this time, water formed as a byproduct was removed azeotropically. After the carbonate additions, the solution was refluxed an additional 2.5 hours until no more water appeared in the Dean-Stark trap. Toluene was then removed from the reaction mixture by distillation. When the temperature of the reaction mixture reached 180° C., it was assumed that the toluene had been removed. After removal of the toluene, the reaction mixture was cooled to room temperature and 3.6 g (20.8 mmol) of 4-nitrophthalonitrile was added in one portion. The resulting reaction mixture was heated to 65–75° C. and stirred at this temperature for 15 hours. The progress of the reaction was monitored by FTIR spectroscopy. After 15 hours, the FTIR spectrum showed the complete disappearance of absorptions attributed to the nitro and hydroxyl groups. The reaction mixture was cooled to room temperature and poured slowly into 400 mL of dilute hydrochloric acid with rapid stirring to break the precipitate into small particles. The solid product was collected by suction filtration, washed exhaustively with water, and dried to give 4.2 g (77%) of the phthalonitrile monomer. A DSC thermogram showed an endothermic transition at 155° C. attributed to the melting of the phthalonitrile monomer.

EXAMPLE 11

Synthesis phthalonitrile monomer (n=4)—To a 50 mL, 3-neck flask fitted with a thermometer, a Dean-Stark trap, a water-cooled condenser and an argon inlet were added 3.3 g (6.9 mmol) of the 3:2 hydroxy-terminated aromatic ether oligomer prepared as in Example 2, 15 mL dimethyl sulfoxide (DMSO), and 5 mL toluene. The Dean-Stark trap was filled with toluene. The reaction mixture was refluxed at 140° C. under argon for 3.5 hours. Anhydrous, pulverized potassium carbonate 2.0 g (14.8 mmol) was then added to the reaction mixture in 4 equal portions over 3 hours while continuing the reflux. During this time, water formed as a byproduct was removed azeotropically. After the carbonate additions, the solution was refluxed an additional 4 hours until no more water appeared in the Dean-Stark trap. Toluene was then removed from the reaction mixture by distillation. When the temperature of the reaction mixture reached 180° C., it was assumed that the toluene had been removed. After removal of the toluene, the reaction mixture was cooled to room temperature and 2.4 g (13.8 mmol) of 4-nitrophthalonitrile was added in one portion. The resulting reaction mixture was heated to 70–75° C. and stirred at this temperature for approximately 24 hours. The progress of the reaction was monitored by FTIR spectroscopy. After 24 hours, the FTIR spectrum showed the complete disappearance of absorptions attributed to the nitro and hydroxyl groups. The reaction mixture was cooled to room temperature and poured slowly into 400 mL of dilute hydrochloric acid with rapid stirring to break the precipitate into small particles. The solid product was collected by suction filtration, washed exhaustively with water, and dried to give 4.4 g (88%) of the phthalonitrile monomer. A DSC thermogram showed an endothermic transition at 147° C. attributed to the melting of the phthalonitrile monomer.

EXAMPLE 12

Synthesis phthalonitrile monomer (n=8)—To a 50 mL, 3-neck flask fitted with a thermometer, a Dean-Stark trap, a water-cooled condenser and an argon inlet were added 1.0 g (1.2 mmol) of the 5:4 hydroxy-terminated aromatic ether oligomer prepared as in Example 3, 7 mL dimethyl sulfoxide (DMSO), and 4 mL toluene. The Dean-Stark trap was filled with toluene. The reaction mixture was refluxed at 130° C. under argon for 3 hours. Anhydrous, pulverized potassium carbonate 0.7 g (5.0 mmol) was then added to the reaction mixture in 4 equal portions over 3 hours while continuing the reflux. During this time, water formed as a byproduct was removed azeotropically. After the carbonate additions, the solution was refluxed an additional 2 hours until no more water appeared in the Dean-Stark trap. Toluene was then removed from the reaction mixture by distillation. When the temperature of the reaction mixture reached 150° C., it was assumed that the toluene had been removed. The reaction mixture was cooled to room temperature and 0.4 g (2.4 mmol) of 4-nitrophthalonitrile was added in one portion. The resulting reaction mixture was heated to 65–70° C. and stirred at this temperature for 4 hours. The temperature of the reaction mixture was then lowered to 40° C. and the reaction was allowed to continue for another 44 h. The progress of the reaction was monitored by FTIR spectroscopy. After 48 hours, the FTIR spectrum showed the complete disappearance of absorptions attributed to the nitro and hydroxyl groups. The reaction mixture was cooled to room temperature and poured slowly into 400 mL of dilute hydrochloric acid with rapid stirring to break the precipitate into small particles. The solid product was collected by suction filtration, washed exhaustively with water, and dried to give 1.0 g (77%) of the phthalonitrile monomer.

EXAMPLE 13

Synthesis of phthalonitrile monomer (n=6) in a one pot, two step reaction from resorcinol and m-diiodobenzene with copper (I) iodide—To a 25 mL, 3-neck flask fitted with a thermometer, a Dean-Stark trap, a water-cooled condenser and an argon inlet were added 0.9 g (8.0 mmol) of resorcinol, 2.0 g (6.0 mmol) of m-diiodobenzene, 2.6 g (8.0 mmol) of cesium carbonate, 0.06 g (0.3 mmol) copper (I) iodide, 10 mL of N,N-dimethylformamide (DMF), and 4 mL of toluene. The Dean-Stark trap was filled with toluene. The reaction mixture was refluxed at 120° C. under argon for 12 hours. During this time, water was removed from the reaction mixture by azeotropic distillation. The progress of the reaction was monitored by FTIR spectroscopy. When complete conversion to the hydroxy-terminated aromatic ether oligomer was indicated by FTIR, the toluene was removed from the reaction mixture by distillation. When the temperature of the reaction mixture reached 150° C., it was assumed that the toluene had been removed. The reaction mixture was then cooled to room temperature and 0.7 g (4.0 mmol) of 4-nitrophthalonitrile was added in one portion. The resulting reaction mixture was heated to 40–60° C. and stirred at this temperature overnight. After 16 hours, the FTIR spectrum showed the complete disappearance of absorptions attributed to the nitro and hydroxyl groups. The reaction mixture was cooled to room temperature and poured slowly into 400 mL of dilute hydrochloric acid with rapid stirring to break the precipitate into small particles. The solid product was collected by suction filtration, washed exhaustively with water, and dried to give 1.8 g (98%) of the phthalonitrile monomer.

EXAMPLE 14

Synthesis of phthalonitrile monomer (n=2) in a one pot, two step reaction from resorcinol and m-dibromobenzene with copper (I) iodide—To a 100 mL, 3-neck flask fitted with a thermometer, a Dean-Stark trap, a water-cooled condenser and an argon inlet were added 4.4 g (40.0 mmol) of resorcinol, 4.7 g (20.0 mmol) of m-dibromobenzene, 13.0 g (40.0 mmol) of cesium carbonate, 0.2 g (1.0 mmol) copper (I) iodide, 25 mL of N,N-dimethylformamide (DMF), and 8 mL of toluene. The Dean-Stark trap was filled with toluene. The reaction mixture was refluxed at 130° C. under argon for 18 hours. During this time, water was removed from the reaction mixture by azeotropic distillation. The progress of the reaction was monitored by FTIR spectroscopy. When complete conversion to the hydroxy-terminated aromatic ether oligomer was indicated by FTIR, the toluene was removed from the reaction mixture by distillation. When the temperature of the reaction mixture reached 150° C., it was assumed that the toluene had been removed. The reaction mixture was then cooled to room temperature and 1.7 g (10.0 mmol) of 4-nitrophthalonitrile was added in one portion. The resulting reaction mixture was heated to 60–80° C. and stirred at this temperature for 8 hours. After 8 hours, the FTIR spectrum showed the complete disappearance of absorptions attributed to the nitro and hydroxyl groups. The reaction mixture was cooled to room temperature and poured slowly into a 2 liter beaker containing dilute hydrochloric acid with rapid stirring to break the precipitate into small particles. The solid product was collected by suction filtration, washed exhaustively with water, and dried to give 9.0 g (82%) of the phthalonitrile monomer.

EXAMPLE 15

Synthesis of phthalonitrile monomer (n=4) in a one pot, two step reaction from resorcinol and m-dibromobenzene with copper (I) iodide—To a 100 mL, 3-neck flask fitted with a thermometer, a Dean-Stark trap, a water-cooled condenser and an argon inlet were added 6.6 g (60.0 mmol)

of resorcinol, 9.5 g (40.0 mmol) of m-dibromobenzene, 23.2 g (71.2 mmol) of cesium carbonate, 0.4 g (2.0 mmol) copper (I) iodide, 25 mL of N,N-dimethylformamide (DMF), and 10 mL of toluene. The Dean-Stark trap was filled with toluene. The reaction mixture was refluxed at 136° C. under argon for 18 hours. During this time, water was removed from the reaction mixture by azeotropic distillation. The progress of the reaction was monitored by FTIR spectroscopy. When complete conversion to the hydroxy-terminated aromatic ether oligomer was indicated by FTIR, the toluene was removed from the reaction mixture by distillation. When the temperature of the reaction mixture reached 150° C., it was assumed that the toluene had been removed. The reaction mixture was then cooled to room temperature and 7.0 g (40.0 mmol) of 4-nitrophthalonitrile was added in one portion. The resulting reaction mixture was heated to 65–80° C. and stirred at this temperature for 26 hours. After 26 hours, the FTIR spectrum showed the complete disappearance of absorptions attributed to the nitro and hydroxyl groups. The reaction mixture was cooled to room temperature and poured slowly into a 2 liter beaker containing dilute hydrochloric acid with rapid stirring to break the precipitate into small particles. The solid product was collected by suction filtration, washed exhaustively with water, and dried to give 11.1 g (76%) of the phthalonitrile monomer.

EXAMPLE 16

Synthesis of phthalonitrile monomer (n=2) in a one pot, two step reaction from resorcinol and m-dibromobenzene with copper (I) bromide—To a 25 mL, 3-neck flask fitted with a thermometer, a Dean-Stark trap, a water-cooled condenser and an argon inlet were added 1.1 g (10.0 mmol) of resorcinol, 1.2 g (5.0 mmol) of m-dibromobenzene, 0.04 g (0.25 mmol) copper (I) bromide, 10 mL of N,N-dimethylformamide (DMF) and 3 mL of toluene. The Dean-Stark trap was filled with toluene. The reaction mixture was refluxed at 135–140° C. under argon for 6 hours. During this time, anhydrous, pulverized potassium carbonate 3.4 g (10.5 mmol) was added to the reaction mixture in 3 portions and water formed as a reaction byproduct was removed azeotropically. The progress of the reaction was monitored by FTIR spectroscopy. When no more water appeared in the Dean-Stark trap, the toluene was removed from the reaction mixture by distillation. It was assumed that all the toluene had been removed when the temperature of the reaction mixture reached 150° C. The reaction mixture was then refluxed an additional 6 hours at 150° C. When complete conversion to the hydroxy-terminated aromatic ether oligomer was indicated by FTIR, the reaction mixture was cooled to room temperature and 1.7 g (10.0 mmol) of 4-nitrophthalonitrile was added in one portion. The resulting mixture was heated to 70–80° C. and stirred at this temperature for 15 hours. After 15 hours, the FTIR spectrum still showed small peaks attributed to the nitro and hydroxyl groups. The reaction mixture was cooled to room temperature and 0.5 g (3.6 mmol) of potassium carbonate was added in one portion. After the addition, the reaction mixture was reheated to 75° C. for 4 hours. Since FTIR spectroscopy showed the complete disappearance of absorptions attributed to the nitro and hydroxyl groups after the 4 hours, the reaction mixture was cooled to room temperature and poured slowly into a 2 liter beaker containing dilute hydrochloric acid with rapid stirring to break the precipitate into small particles. The solid product was collected by suction filtration, washed exhaustively with water, and dried to give 1.3 g (48%) of the phthalonitrile monomer.

C. Curing of Phthalonitrile Monomer

EXAMPLE 17

Curing of phthalonitrile monomer (n=4) at 200° C. in the presence of 7.9 wt % of p-BAPS followed by post-cure at 375° C. for 2 hours and thermal and oxidative stability measurement—To the melt of phthalonitrile monomer at 200° C. prepared as in Example 11 was added bis[4-(4-aminophenoxy)phenyl]sulfone (p-BAPS, 7.9 wt %) with stirring. The dark curing mixture was cured by heating at 200° C. for 4.5 hours. Gelation occurred during the heat treatment. The thermoset was post-cured at 300° C. for 1 hour and at 375° C. for 2 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 18

Curing of phthalonitrile monomer (n=2) at 200° C. in the presence of 2.0 wt % of p-APB followed by post-cure at 375° C. for 2 hours and thermal and oxidative stability measurement—To the melt of phthalonitrile monomer at 200° C. prepared as in Example 10 was added 1,4-bis(3-aminophenoxy)benzene (p-APB, 2.0 wt %) with stirring. The dark curing mixture was cured by heating at 200° C. for 4.5 hours. Gelation occurred during the heat treatment. The thermoset was post-cured at 300° C. for 1 hour and at 375° C. for 2 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 19

Curing of phthalonitrile monomer (n=2) at 200° C. in the presence of 2.0 wt % of p-APB followed by post-cure at 375° C. for 5 hours and thermal and oxidative stability measurement—To the melt of phthalonitrile monomer at 200° C. prepared as in Example 10 was added 1,4-bis(3-aminophenoxy)benzene (p-APB, 2.0 wt %) with stirring. The dark curing mixture was cured by heating at 200° C. for 4.5 hours. Gelation occurred during the heat treatment. The thermoset was post-cured at 300° C. for 1 hour and at 375° C. for 5 hours under nitrogen. The thermal and oxidative stability of the thermoset as determined by TGA was found to be a function of curing additive and curing temperature.

The thermoset showed superb thermal stability when cured at 200° C. Further heating to 375° C. under inert conditions resulted in an improvement in the thermal stability. The thermo-oxidative properties were investigated between 25° C and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 20

Curing of phthalonitrile monomer (n=2) at 200° C. in the presence of 2.9 wt % of p-BAPS followed by post-cure at 375° C. for 2 hours and thermal and oxidative stability measurement—To the melt of phthalonitrile monomer at 200° C. prepared as in Example 10 was added bis[4-(4-aminophenoxy)phenyl]sulfone (p-BAPS, 2.9 wt %) with stirring. The dark curing mixture was cured by heating at 200° C. for 4.5 hours. Gelation occurred during the heat treatment. The thermoset was post-cured at 300° C. for 1 hour and at 375° C. for 2 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 21

Curing of phthalonitrile monomer (n=2) at 200° C. in the presence of 2.9 wt % of p-BAPS followed by post-cure at 375° C. for 5 hours and thermal and oxidative stability measurement—To the melt of phthalonitrile monomer at 200° C. prepared as in Example 10 was added bis[4-(4-aminophenoxy)phenyl]sulfone (p-BAPS, 2.9 wt %) with stirring. The dark curing mixture was cured by heating at 200° C. for 4.5 hours. Gelation occurred during the heat treatment. The thermoset was post-cured at 300° C. for 1 hour and at 375° C. for 5 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 22

Curing of phthalonitrile monomer (n=2) at 200° C. in the presence of 1.7 wt % of p-APB followed by post-cure at 375° C. for 8 hours and thermal and oxidative stability measurement—To the melt of phthalonitrile monomer at 200° C. prepared as in Example 10 was added 1,4-bis(3-aminophenoxy)benzene (p-APB, 1.7 wt %) with stirring. The dark curing mixture was cured by heating at 200° C. for 4.5 hours. Gelation occurred during the heat treatment. The thermoset was post-cured at 300° C. for 1 hour and at 375° C. for 8 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 23

Curing of phthalonitrile monomer (n=2) at 200° C. in the presence of 2.5 wt % of p-BAPS followed by post-cure at 375° C. for 8 hours and thermal and oxidative stability measurement—To the melt of phthalonitrile monomer at 200° C. prepared as in Example 10 was added bis[4-(4-aminophenoxy)phenyl]sulfone (p-BAPS, 2.5 wt %) with stirring. The dark curing mixture was cured by heating at 200° C. for 4.5 hours. Gelation occurred during the heat treatment. The thermoset was post-cured at 300° C. for 1 hour and at 375° C. for 8 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 24

Curing of phthalonitrile monomer (n=2) at 160° C. in the presence of 4.8 wt % of p-APB followed by post-cure at 375° C. for 16 hours and thermal and oxidative stability measurement—To the melt of phthalonitrile monomer at 200° C. prepared as in Example 10 was added 1,4-bis(3-aminophenoxy)benzene (p-APB, 4.8 wt %) with stirring. The dark curing mixture was cured by heating at 160° C. for 2 hours. Gelation occurred during the heat treatment. The thermoset was post-cured at 300° C. for 1 hour and at 375° C. for 16 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 25

Curing of phthalonitrile monomer (n=2) at 160° C. in the presence of 7.0 wt % of p-BAPS followed by post-cure at 375° C. for 16 hours and thermal and oxidative stability measurement—To the melt of phthalonitrile monomer at 200° C. prepared as in Example 10 was added bis[4-(4-aminophenoxy)phenyl]sulfone (p-BAPS, 7.0 wt %) with stirring. The dark curing mixture was cured by heating at 160° C. for 2 hours. Gelation occurred during the heat treatment. The thermoset was post-cured at 300° C. for 1 hour and at 375° C. for 16 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 26

Curing of phthalonitrile monomer (n=2) at 200° C. in the presence of 4.7 wt % of p-APB followed by post-cure at 375° C. for 8 hours and thermal and oxidative stability measurement—To the melt of phthalonitrile monomer at 200° C. prepared as in Example 10 was added 1,4-bis(3-aminophenoxy)benzene (p-APB, 4.7 wt %) with stirring. The dark curing mixture was cured by heating at 200° C. for 3 hours. Gelation occurred during the heat treatment. The thermoset was post-cured at 300° C. for 1 hour and at 375° C. for 8 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 27

Curing of phthalonitrile monomer (n=2) at 200° C. in the presence of 7.0 wt % of p-BAPS post-cure at 375° C. for 8 hours and thermal and oxidative stability measurement—To the melt of phthalonitrile monomer at 200° C. prepared as in Example 10 was added bis[4-(4-aminophenoxy)phenyl] sulfone (p-BAPS, 7.0 wt %) with stirring. The dark curing mixture was cured by heating at 200° C. for 3 hours. Gelation occurred during the heat treatment. The thermoset was post-cured at 300° C. for 1 hour and at 375° C. for 8 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 28

Curing of phthalonitrile monomer (n=2) at 200° C. in the presence of 23.3 wt % of p-BAPS followed by post-cure at 375° C. for 8 hours and thermal and oxidative stability measurement—To the melt of phthalonitrile monomer at 200° C. prepared as in Example 10 was added bis[4-(4-aminophenoxy)phenyl]sulfone (p-BAPS, 23.3 wt %) with stirring. The dark curing mixture was cured by heating at 200° C. for 2 hours. Gelation occurred during the heat treatment. The thermoset was post-cured at 300° C. for 1 hour and at 375° C. for 8 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 29

Curing of phthalonitrile monomer (n=2) at 200° C. in the presence of 15.7 wt % of p-BAPS followed by post-cure at 375° C. for 8 hours and thermal and oxidative stability measurement—To the melt of phthalonitrile monomer at 200° C. prepared as in Example 10 was added bis[4-(4-aminophenoxy)phenyl]sulfone (p-BAPS, 15.7 wt %) with stirring. The dark curing mixture was cured by heating at 200° C. for 2 hours. Gelation occurred during the heat treatment. The thermoset was post-cured at 300° C. for 1 hour and at 375° C. for 8 hours under nitrogen. The thermal and oxidative stability of the thermoset as determined by TGA was found to be a function of curing additive and curing temperature. The thermoset showed superb thermal stability when cured at 200° C. Further heating to 375° C. under inert conditions resulted in an improvement in the thermal stability. The thermo-oxidative properties were investigated between 25° C. and 1000° C. Samples of the thermoset were compared in relation to the temperature that the materials commenced to lose weight and catastrophic decomposition occurred. The thermoset showed excellent oxidative stability when cured at 200° C. The thermoset commenced to lose weight at a higher temperature upon postcuring at 375° C. indicating an improvement in the oxidative stability.

EXAMPLE 30

Curing of phthalonitrile monomer (n=2) at 150° C. in the presence of 4.8 wt % of p-APB followed by post-cure at 200° C. for 5 hours and DSC thermogram to 450° C.—To the melt of phthalonitrile monomer at 150° C. prepared as in Example 10 was added 1,4-bis(3-aminophenoxy)benzene (p-APB, 4.8 wt %) with stirring. The dark curing mixture was cured by heating at 150° C. for 2 hours. Gelation occurred during the heat treatment. A small sample (~2 mg) of this material was placed in a DSC pan. A sample of the cured thermoset was post-cured at 200° C. for 5 hours under nitrogen in a DSC pan. A DSC thermogram from 25° to 450° C. of the post-cured sample showed only one small exothermic transition at 300° C. attributed to the reaction of APB with the phthalonitrile monomer. Upon cooling and rerunning the same post-cured sample, no transitions were seen in the DSC thermogram and therefore the sample was assumed to be fully cured.

EXAMPLE 31

Curing of phthalonitrile monomer (n=2) at 150° C. in the presence of 4.8 wt % of p-APB followed by post-cure at 200° C. for 8 hours and DSC thermogram to 450° C.—To the melt of phthalonitrile monomer at 150° C. prepared as in Example 10 was added 1,4-bis(3-aminophenoxy)benzene (p-APB, 4.8 wt %) with stirring. The dark curing mixture was cured by heating at 150° C. for 2 hours. Gelation occurred during the heat treatment. A sample of the cured thermoset was post-cured at 200° C. for 8 hours under nitrogen in a DSC pan. A DSC thermogram from 25° to 450° C. of the post-cured sample showed a small exothermic transition at 300° C. attributed to the reaction of APB with the phthalonitrile monomer. Upon cooling and rerunning the same post-cured sample, no transitions were seen in the DSC thermogram. The lack of transitions indicated that no further reaction of APB with the phthalonitrile monomer had occurred.

EXAMPLE 32

Curing of phthalonitrile monomer (n=2) at 150° C. in the presence of 7.0 wt % of p-BAPS followed by post-cure at 200° C. for 5 hours and DSC thermogram to 450° C.—To the melt of phthalonitrile monomer at 150° C. prepared as in Example 10 was added bis[4-(4-aminophenoxy)phenyl] sulfone (p-BAPS, 7.0 wt %) with stirring. The dark curing mixture was cured by heating at 150° C. for 2 hours. Gelation occurred during the heat treatment. A sample of the cured thermoset was post-cured at 200° C. for 5 hours under nitrogen in a DSC pan. A DSC thermogram from 25° to 450° C. of the post-cured sample showed no transitions. The lack of transitions indicated that no further reaction of APB with the phthalonitrile monomer had occurred.

EXAMPLE 33

Curing of phthalonitrile monomer (n=2) at 200° C. in the presence of 4.7 wt % of p-APB and DSC thermogram to 450° C.—To the melt of phthalonitrile monomer at 200° C. prepared as in Example 10 was added 1,4-bis(3-aminophenoxy)benzene (p-APB, 4.7 wt %) with stirring. The dark curing mixture was cured by heating at 200° C. for 3 hours. Gelation occurred during the heat treatment. A small sample (~2 mg) of this material was placed in a DSC pan. The DSC thermogram from 25° to 450° C. showed two small exothermic transitions at 246° C. and at ~385° C. attributed to the reaction of the amine with the phthalonitrile monomer.

EXAMPLE 34

Curing of phthalonitrile monomer (n=2) at 200° C. in the presence of 7.0 wt % of p-BAPS followed by post-cure at 200° C. for 5 hours and DSC thermogram to 450° C.—To the melt of phthalonitrile monomer at 200° C. prepared as in Example 10 was added bis[4-(4-aminophenoxy)phenyl] sulfone (p-BAPS, 7.0 wt %) with stirring. The dark curing mixture was cured by heating at 200° C. for 3 hours. Gelation occurred during the heat treatment. A small sample (~2 mg) of the cured material was placed in a DSC pan. The DSC thermogram from 25° C. to 450° C. showed two exothermic transitions at 234° C. and at ~375° C. attributed to reaction of APB with the phthalonitrile monomer. A second sample of the same thermoset was post-cured at 200° C. for 5 hours under nitrogen in a DSC pan. A DSC thermogram from 25° to 450° C. of the post-cured sample showed two exothermic transitions at 300° C. and at 365° C. attributed to the reaction of BAPS with the phthalonitrile monomer. The results indicate that the phthalonitrile monomer had not fully reacted under the conditions at 200° C.

EXAMPLE 35

DSC thermogram of phthalonitrile monomer (n=2) in the presence of 12.5 wt % diphenylamine and DSC thermogram to 450° C.—To the phthalonitrile monomer prepared as in Example 10 was added 12.5 wt % diphenylamine in a DSC pan. The DSC thermogram from 25° C. to 450° C. showed two endothermic transitions at 52° C. and at 61° C. attributed to melting of the additive and the phthalonitrile monomer, respectively, and an two exothermic transitions at 183° C. and ~270° C. attributed to reaction of the amine with the phthalonitrile monomer.

EXAMPLE 36

DSC thermogram of phthalonitrile monomer (n=2) in the presence of 3.6 wt % diphenylamine and DSC thermogram to 450° C.—To the phthalonitrile monomer prepared as in Example 10 was added 3.6 wt % diphenylamine in a DSC pan. The DSC thermogram from 25° C. to 450° C. showed two endothermic transitions at 50° C. and at 62° C. attributed to melting of the additive and the phthalonitrile monomer. respectively, and an two exothermic transitions at 185° C. and ~270° C. attributed to reaction of the amine with the phthalonitrile monomer.

EXAMPLE 37

DSC thermogram of phthalonitrile monomer (n=2) in the presence of 13.9 wt % 1,3-phenylenediamine and DSC thermogram to 450° C.—To the phthalonitrile monomer prepared as in Example 10 was added 13.9 wt % 1,3-phenylenediamine in a DSC pan. The DSC thermogram from 25° C. to 450° C. showed an endothermic transition at 61° C. attributed to the melting of both the additive and the phthalonitrile monomer, and an exothermic transition at 242° C. attributed to reaction of the amine with the phthalonitrile monomer.

EXAMPLE 38

DSC thermogram of phthalonitrile monomer (n=2) in the presence of 3.5 wt % 1,3-phenylenediamine and DSC thermogram to 450° C.—To the phthalonitrile monomer prepared as in Example 10 was added 3.5 wt % 1,3-phenylenediamine in a DSC pan. The DSC thermogram from 25° C. to 450° C. showed an endothermic transition at 61° C. attributed to the melting of both the additive and the phthalonitrile monomer, and an exothermic transition at 255° C. attributed to reaction of the amine with the phthalonitrile monomer.

EXAMPLE 39

DSC thermogram of phthalonitrile monomer (n=2) in the presence of 6.3 wt % of p-toluenesulfonic acid and DSC thermogram to 450° C.—To the phthalonitrile monomer prepared as in Example 10 was added 6.3 wt % p-toluenesulfonic acid in a DSC pan. The DSC thermogram from 25° C. to 450° C. showed two endothermic transitions at 62° C. and at 103° C. attributed to melting of the phthalonitrile monomer and the additive, respectively, and an exothermic transition at 299° C. attributed to reaction of the acid with the phthalonitrile monomer.

EXAMPLE 40

Curing of 50:50 blend of phthalonitrile monomer (n=2) and 4,4'-bis(3,4-dicyanophenoxy)biphenyl at 250° C. in the presence of 2.8 wt % of p-BAPS and DSC thermogram to 450° C.—A sample containing 25 mg of the phthalonitrile monomer prepared as in Example 10, 25 mg of 4.4'-bis(3,4-dicyanophenoxy)biphenyl and 1.5 mg (2.8 wt %) of bis[4-(4-aminophenoxy)phenyl]sulfone (p-BAPS) in an aluminum planchet was at 250° C. with stirring. The blend was cured by heating in air at 250° C. for 4 hours. Gelation occurred during the heat treatment. A DSC thermogram of the cured material from 25° C. to 450° C. showed no transitions. The lack of transitions indicated that no further reaction of BAPS with the phthalonitrile monomer had occurred.

EXAMPLE 41

Curing of 25:75 blend of phthalonitrile monomer (n=2) and 4,4'-bis(3,4-dicyanophenoxy)biphenyl at 250° C. in the presence of 2.8 wt % of p-BAPS and DSC thermogram to 450° C.—A sample containing 12 mg of the phthalonitrile monomer prepared as in Example 10, 38 mg of 4,4'-bis(3,4-dicyanophenoxy)biphenyl and 1.5 mg (2.8 wt %) of bis[4-(4-aminophenoxy)phenyl]sulfone (p-BAPS) in an aluminum planchet was melted at 250° C. with stirring. The blend was cured by heating in air at 250° C. for 4 hours. Gelation occurred during the heat treatment. A DSC thermogram of the cured material from 25° C. to 450° C. showed no transitions. The lack of transitions indicated that no further reaction of BAPS with the phthalonitrile monomer had occurred.

EXAMPLE 42

Curing of 75:25 blend of phthalonitrile monomer (n=2) and 4,4'-bis(3,4-dicyanophenoxy)biphenyl at 250° C. in the presence of 2.8 wt % of p-BAPS and DSC thermogram to 450° C.—A sample containing 38 mg of the phthalonitrile monomer prepared as in Example 10, 13 mg of 4,4'-bis(3,4-dicyanophenoxy)biphenyl and 1.5 mg (2.8 wt %) of bis[4-(4-aminophenoxy)phenyl]sulfone (p-BAPS) in an aluminum planchet was melted at 250° C. with stirring. The blend was cured by heating in air at 250° C. for 4 hours. Gelation occurred during the heat treatment. A DSC thermogram of the cured material from 25° C. to 450° C. showed no transitions. The lack of transitions indicated that no further reaction of BAPS with the phthalonitrile monomer had occurred.

EXAMPLE 43

Curing of 50:50 blend of phthalonitrile monomer (n=2) and 4,4'-bis(3,4-dicyanophenoxy)biphenyl at 250° C. in the presence of 2.0 wt % of p-BAPS—A sample containing 1.58 mg of the phthalonitrile monomer prepared as in Example 10, 1.45 mg 4,4'-bis(3,4-dicyanophenoxy)biphenyl and 0.06 mg (2.0 wt %) of bis[4-(4-aminophenoxy)phenyl]sulfone (p-BAPS) was weighed into a DSC pan. The DSC thermogram from 25° C. to 450° C. showed two endothermic transitions at 61° C. and at 213° C. attributed to melting of the phthalonitrile monomers and an exothermic transition at 262° C. attributed to reaction of the amine with the phthalonitrile monomers.

EXAMPLE 44

Curing of 75:25 blend of phthalonitrile monomer (n=2) and 4,4'-bis(3,4-dicyanophenoxy)biphenyl at 250° C. in the presence of 2.3 wt % of p-BAPS—A sample containing 2.75 mg of the phthalonitrile monomer prepared as in Example 10, 1.09 mg of 4,4'-bis(3,4-dicyanophenoxy)biphenyl and 0.09 mg (2.3 wt %) of bis[4-(4-aminophenoxy)phenyl]sulfone (p-BAPS) was weighed into a DSC pan. The DSC thermogram from 25° C. to 450° C. showed two endothermic transitions at 63° C. and at 212° C. attributed to melting of the phthalonitrile monomers and an exothermic transition at 259° C. attributed to reaction of the amine with the phthalonitrile monomers.

EXAMPLE 45

Curing of 25:75 blend of phthalonitrile monomer (n=2) and 4,4'-bis(3,4-dicyanophenoxy)biphenyl at 250° C. in the presence of 3.0 wt % of p-BAPS—A sample containing 0.93 mg of the phthalonitrile monomer prepared as in Example 10, 2.95 mg 4,4'-bis(3,4-dicyanophenoxy)biphenyl and 0.12 mg (3.0 wt %) of bis[4-(4-aminophenoxy)phenyl]sulfone (p-BAPS) was weighed into a DSC pan. The DSC thermogram from 25° C. to 450° C. showed two endothermic transitions at 63° C. and at 226° C. attributed to melting of the phthalonitrile monomers and an exothermic transition at 264° C. attributed to reaction of the amine with the phthalonitrile monomers.

EXAMPLE 46

DSC thermogram of blend of phthalonitrile monomer (n=2) and 4,4'-bis(3,4-dicyanophenoxy)biphenyl—A sample containing 1.30 mg of the phthalonitrile monomer prepared as in Example 10 and 1.40 mg of 4,4'-bis(3,4-dicyanophenoxy)biphenyl was weighed into a DSC pan. An initial DSC thermogram from 25° C. to 270° C. showed two endothermic transitions at 63° C. and at 220° C. attributed to melting of the phthalonitrile monomers. After the sample was cooled, a second DSC thermogram was obtained from 25° C. to 270° C. The second thermogram showed an endothermic transition at 63° C. attributed to the oligomeric phthalonitrile monomer, an endothermic transition between 185–195° C. attributed to the biphenyl phthalonitrile monomer melting at a lower temperature and an exothermic transition at 120° C. attributed to an amorphous to crystalline phase change.

EXAMPLE 47

Curing of phthalonitrile monomer (n=2) at 120° C. in the presence of 12–16 wt % of epoxy amine hardener and DSC thermogram to 400° C.—To the melt of phthalonitrile monomer at 120° C. prepared as in Example 10 was added epoxy amine hardener (12–16 wt %) with stirring. The dark curing mixture was cured by heating at 120° C. for 2 hours. Gelation occurred during the heat treatment. A small sample (~2 mg) of this material was placed in a DSC pan. The DSC thermogram from 25° to 400° C. showed two exothermic transitions at ~175° C. and at 233° C. attributed to the reaction of the amine with the phthalonitrile monomer. The thermogram also showed an endothermic transition at 57° C. attributed to the phthalonitrile monomer.

EXAMPLE 48

Curing of phthalonitrile monomer (n=4) at 100° C. in the presence of 5–10 wt % of epoxy amine hardener and DSC thermogram to 400° C.—To the melt of phthalonitrile monomer at 150° C. prepared as in Example 11 was added epoxy amine hardener (5–10 wt %) with stirring. After mixing, the dark curing mixture was cured by heating at 100° C. for 6.5 hours. Gelation occurred during the heat treatment. A small sample (~2 mg) of this material was placed in a DSC pan. The DSC thermogram from 25° to 400° C. showed an endothermic transition at 46° C. attributed to the phthalonitrile monomer and an exothermic transition at 246° C. attributed to the reaction of the amine with the phthalonitrile monomer.

EXAMPLE 49

Curing of phthalonitrile monomer (n=4) at 100° C. in the presence of 5–10 wt % of 1,12-diaminododecane and DSC thermogram to 400° C.—To the melt of phthalonitrile monomer at 150° C. prepared as in Example 11 was added 1,12-diaminododecane (5–10 wt %) with stirring. After mixing, the dark curing mixture was cured by heating at 100° C. for 6.5 hours. Gelation occurred during the heat treatment. A small sample (~2 mg) of this material was placed in a DSC pan. The DSC thermogram from 25° to 400° C. showed an endothermic transition at 45° C. attributed to the phthalonitrile monomer and an exothermic transition at 263° C. attributed to the reaction of the amine with the phthalonitrile monomer.

EXAMPLE 50

Curing of phthalonitrile monomer (n=4) at 80° C. in the presence of 5–10 wt % of epoxy amine hardener and DSC thermogram to 400° C.—To the melt of phthalonitrile monomer at 200° C. prepared as in Example 11 was added epoxy amine hardener (5–10 wt %) with stirring. After mixing, the dark curing mixture was cured by heating at 80° C. for 4 hours. Gelation occurred during the heat treatment. A small sample (~2 mg) of this material was placed in a DSC pan. The DSC thermogram from 25° to 400° C. showed an endothermic transition at 44° C. attributed to the phthalonitrile monomer and an exothermic transition at 246° C. attributed to the reaction of the amine with the phthalonitrile monomer.

EXAMPLE 51

Curing of phthalonitrile monomer (n=4) at 80° C. in the presence of 5–10 wt % of 1,12-diaminododecane and DSC thermogram to 400° C.—To the melt of phthalonitrile monomer at 200° C. prepared as in Example 11 was added 1,12-diaminododecane (5–10 wt %) with stirring. After mixing, the dark curing mixture was cured by heating at 80° C. for 4 hours. Gelation occurred during the heat treatment. A small sample (~2 mg) of this material was placed in a DSC pan. The DSC thermogram from 25° to 400° C. showed an endothermic transition at 41° C. attributed to the phthalonitrile monomer and an exothermic transition at 248° C. attributed to the reaction of the amine with the phthalonitrile monomer.

EXAMPLE 52

Curing of phthalonitrile monomer (n=4) at 150° C. in the presence of 5–10 wt % of epoxy amine hardener and DSC thermogram to 400° C.—To the melt of phthalonitrile monomer at 150° C. prepared as in Example 11 was added epoxy amine hardener (5–10 wt %) with stirring. After mixing, the dark curing mixture was cured by heating at 150° C. for 4 hours. Gelation occurred during the heat treatment. A small sample (~2 mg) of this material was placed in a DSC pan. The DSC thermogram from 25° to 400° C. showed an endothermic transition at 49° C. attributed to the phthalonitrile monomer and an exothermic transition at 270° C. attributed to the reaction of the amine with the phthalonitrile monomer.

EXAMPLE 53

Curing of phthalonitrile monomer (n=4) at 150° C. in the presence of 5–10 wt % of 1,6-hexanediamine and DSC thermogram to 400° C.—To the melt of phthalonitrile monomer at 150° C. prepared as in Example 11 was added 1,6-hexanediamine (5–10 wt %) with stirring. After mixing, the dark curing mixture was cured by heating at 150° C. for 13 hours. Gelation occurred during the heat treatment. A small sample (~2 mg) of this material was placed in a DSC pan. The DSC thermogram from 25° to 400° C. showed an endothermic transition at 52° C. attributed to the phthalonitrile monomer and an exothermic transition at 273° C. attributed to the reaction of the amine with the phthalonitrile monomer.

EXAMPLE 54

Curing of phthalonitrile monomer (n=4) at 100° C. in the presence of 5–10 wt % of 1,6-hexanediamine and DSC thermogram to 400° C.—To the melt of phthalonitrile monomer at 150° C. prepared as in Example 11 was added 1,6-hexanediamine (5–10 wt %) with stirring. After mixing, the dark curing mixture was cured by heating at 100° C. for 13 hours. Gelation occurred during the heat treatment. A small sample (~2 mg) of this material was placed in a DSC pan. The DSC thermogram from 25° to 400° C. showed an endothermic transition at 47° C. attributed to the phthalonitrile monomer and an exothermic transition at 258° C. attributed to the reaction of the amine with the phthalonitrile monomer.

EXAMPLE 55

Curing of phthalonitrile monomer (n=4) at 150° C. in the presence of 40 wt % of epoxy amine hardener and DSC thermogram to 400° C.—To the melt of phthalonitrile monomer at 150° C. prepared as in Example 11 was added epoxy amine hardener (40 wt %) with stirring. After mixing, the dark curing mixture was cured by heating at 150° C. for 8 hours. Gelation occurred during the heat treatment. A small sample (~2 mg) of this material was placed in a DSC pan. The DSC thermogram from 25° to 400° C. showed an endothermic transition at 52° C. attributed to the phthalonitrile monomer and an exothermic transition at 255° C. attributed to the reaction of the amine with the phthalonitrile monomer.

EXAMPLE 56

Curing of phthalonitrile monomer (n=4) at 150° C. in the presence of 40 wt % 1,6-hexanediamine and DSC thermogram to 400° C.—To the melt of phthalonitrile monomer at 150° C. prepared as in Example 11 was added 1,6-hexanediamine (40 wt %) with stirring. After mixing, the dark curing mixture was cured by heating at 150° C. for 16 hours. Gelation occurred during the heat treatment. A small sample (~2 mg) of this material was placed in a DSC pan. The DSC thermogram from 25° to 400° C. showed no transitions. The lack of transitions indicated that no further reaction between the amine and the phthalonitrile monomer had occurred.

EXAMPLE 57

Curing of phthalonitrile monomer (n=2) at 150° C. in the presence of 40 wt % 1,6-hexanediamine and DSC thermogram to 400° C.—To the melt of phthalonitrile monomer at 150° C. prepared as in Example 10 was added 1,6-hexanediamine (40 wt %) with stirring. After mixing, the dark curing mixture was cured by heating at 150° C. for 16 hours. Gelation occurred during the heat treatment. A small sample (~2 mg) of this material was placed in a DSC pan. The DSC thermogram from 25° to 400° C. showed a small exothermic transition at 246° C. attributed to the reaction of the amine with the phthalonitrile monomer.

EXAMPLE 58

Curing of phthalonitrile monomer (n=4) at 150° C. in the presence of 29 wt % of 1,6-hexanediamine and DSC thermogram to 400° C.—To the melt of phthalonitrile monomer at 150° C. prepared as in Example 11 was added 1,6-hexanediamine (29 wt %) with stirring. After mixing, the dark curing mixture was cured by heating at 150° C. for 12 hours. Gelation occurred during the heat treatment. A small sample (~2 mg) of this material was placed in a DSC pan. The DSC thermogram from 25° to 400° C. showed an exothermic transition at 259° C. attributed to the reaction of the amine with the phthalonitrile monomer.

EXAMPLE 59

Curing of phthalonitrile monomer (n=4) at 150° C. in the presence of 17 wt % of 1,6-hexanediamine and DSC thermogram to 400° C.—To the melt of phthalonitrile monomer at 150° C. prepared as in Example 11 was added 1,6-hexanediamine (17 wt %) with stirring. After mixing, the dark curing mixture was cured by heating at 150° C. for 12 hours. Gelation occurred during the heat treatment. A small sample (~2 mg) of this material was placed in a DSC pan. The DSC thermogram from 25° to 400° C. showed an exothermic transition at 273° C. attributed to the reaction of the amine with the phthalonitrile monomer.

EXAMPLE 60

Curing of phthalonitrile monomer (n=4) at 150° C. in the presence of 38 wt % of p-APB and DSC thermogram to 400° C.—To the melt of phthalonitrile monomer at 150° C. prepared as in Example 11 was added 1,4-bis(3-aminophenoxy)benzene (p-APB, 38 wt %) with stirring. After mixing, the dark curing mixture was cured by heating at 150° C. for 3 hours. Gelation occurred during the heat treatment. A small sample (~2 mg) of this material was placed in a DSC pan. The DSC thermogram from 25° to 400° C. showed endothermic transitions at 39° C. attributed to the phthalonitrile monomer, at 119° C. and 146° C. attributed to the p-APB and an exothermic transition at 252° C. attributed to the reaction of the amine with the phthalonitrile monomer. After the sample was cooled, a second DSC thermogram was obtained from 25° C. to 270° C. The second DSC thermogram showed no transitions. The lack of transitions indicated that no further reaction of BAPS with the phthalonitrile monomer had occurred.

EXAMPLE 61

Curing of phthalonitrile monomer (n=4) at 150° C. in the presence of 38 wt % of diphenylamine and DSC thermogram to 400° C.—To the melt of phthalonitrile monomer at 150° C. prepared as in Example 11 was added diphenylamine (38 wt %) with stirring. After mixing, the dark curing mixture was cured by heating at 150° C. for 3 hours. Gelation occurred during the heat treatment. A small sample (~2 mg) of this material was placed in a DSC pan. The DSC thermogram from 25° to 400° C. showed an endothermic transition at 44° C. attributed to the phthalonitrile monomer and an exothermic transition at 269° C. attributed to the reaction of the amine with the phthalonitrile monomer. After the sample was cooled, a second DSC thermogram was obtained from 25° C. to 270° C. The second DSC thermogram showed no transitions. The lack of transitions indicated that no further reaction of BAPS with the phthalonitrile monomer had occurred.

EXAMPLE 62

Curing of phthalonitrile monomer (n=4) at 150° C in the presence of 38 wt % of p-toluene sulfonic acid and DSC thermogram to 400° C.—To the melt of phthalonitrile monomer at 150° C. prepared as in Example 11 was added p-toluene sulfonic acid (38 wt %) with stirring. After mixing, the dark curing mixture was cured by heating at 150° C. for 3 hours. Gelation occurred during the heat treatment. A small sample (~2 mg) of this material was placed in a DSC pan. The DSC thermogram from 25° to 400° C. showed exothermic transitions at 248° C. and 296° C. attributed to the reaction of the amine with the phthalonitrile monomer. After the sample was cooled, a second DSC thermogram was obtained from 25° C. to 270° C. The second DSC thermogram showed no transitions. The lack of transitions indicated that no further reaction of BAPS with the phthalonitrile monomer had occurred.

EXAMPLE 63

DSC thermogram to 400° C. of phthalonitrile monomer (n=4) in the presence of 59 wt % of cuprous bromide—A sample containing 1.4 mg of the phthalonitrile monomer prepared as in Example 15 and 2.0 mg (CuBr, 59 wt %) cuprous bromide was weighed into a DSC pan. The DSC thermogram from 25° C. to 400° C. showed two endothermic transitions at 46° C. and at 73° C. attributed to melting of the monomer and an exothermic transition at 197° C. attributed to reaction of the metal salt with the phthalonitrile monomer. After the sample was cooled, a second DSC thermogram was obtained from 25° C. to 400° C. The second DSC thermogram showed no transitions. The lack of transitions indicated that no further reaction of the metal salt with the phthalonitrile with the monomer had occurred.

EXAMPLE 64

Curing of phthalonitrile monomer (n=4) at 125° C. in the presence of 30 wt % of cuprous iodide and DSC thermogram to 400° C.—To the melt of phthalonitrile monomer at 125°

C. prepared as in Example 15 was added cuprous iodide (CuI, 30 wt %) with stirring. After mixing, the dark polymerization mixture was cured by heating at 125° C. for 4 hours. Gelation occurred during the heat treatment. A small sample (~2 mg) of this material was placed in a DSC pan. The DSC thermogram from 25° to 400° C. showed endothermic transitions at 46° C. and at 73° C. attributed to the phthalonitrile monomer and a large exothermic transition at 258° C. attributed to the reaction of the metal salt with the phthalonitrile monomer. After the sample was cooled, a second DSC thermogram was obtained from 25° C. to 270° C. The second DSC thermogram showed only a small transition at 296° C. attributed to the reaction of the metal salt with the phthalonitrile monomer.

EXAMPLE 65

Curing of phthalonitrile monomer (n=4) at 125° C. in the presence of 30 wt % of cuprous bromide and DSC thermogram to 400° C.—To the melt of phthalonitrile monomer at 125° C. prepared as in Example 15 was added cuprous bromide (CuBr, 30 wt %) with stirring. After mixing, the dark polymerization mixture was cured by heating at 125° C. for 4 hours. Gelation occurred during the heat treatment. A small sample (~2 mg) of this material was placed in a DSC pan. The DSC thermogram from 25° to 400° C. showed an endothermic transition at 46° C. attributed to the metal salt and a large exothermic transition at 261° C. attributed to the reaction of the metal salt with the phthalonitrile monomer. After the sample was cooled, a second DSC thermogram was obtained from 25° C. to 270° C. The second DSC thermogram only a small transition at 265° C. attributed to the reaction of the metal salt with the phthalonitrile monomer.

EXAMPLE 66

Curing of phthalonitrile monomer (n=4) at 150° C. in the presence of 25 wt % of stannous chloride dihydrate and DSC thermogram to 400° C.—To the melt of phthalonitrile monomer at 150° C. prepared as in Example 15 was added stannous chloride dihydrate (SnCl$_2$.2H$_2$O, 25 wt %) with stirring. After mixing, the dark polymerization mixture was cured by heating at 150° C. for 18 hours. Gelation occurred during the heat treatment. A small sample (~2 mg) of this material was placed in a DSC pan. The DSC thermogram from 25° to 400° C. showed endothermic transitions at 36° C. and at 60° C. attributed to the metal salt and the phthalonitrile monomer, respectively, and an exothermic transition at 224° C. attributed to the reaction of the metal salt with the phthalonitrile monomer. After the sample was cooled, a second DSC thermogram was obtained from 25° C. to 400° C. The second DSC thermogram showed only a small transition at 268° C. attributed to the reaction of the amine with the phthalonitrile monomer.

EXAMPLE 67

Curing of phthalonitrile monomer (n=4) in the presence of 1.5 wt % of stannous chloride dihydrate and the thermal stability of the cured polymer—A sample containing 16.05 mg of the phthalonitrile monomer prepared as in Example 15 and 0.24 mg stannous chloride dihydrate (SnCl$_2$.2H$_2$O, 1.5 wt %) was weighed into a TGA pan. The mixture was cured by heating at 200° C. for 4 hours, 300° C. for 2 h and 375° C. for 8 h in a nitrogen atmosphere. The thermal stability of the cured polymer as determined by TGA was investigated by heating the cured samples from 25° C. to 1000° C. at 10° C./minute. The cured polymer commenced to lose weight slowly at ~480° C. The high char yield of the cured polymer, 74% after heating to 1000° C., showed that the cured material had excellent thermal stability.

EXAMPLE 68

Curing of phthalonitrile monomer (n=4) in the presence of 2.4 wt % of aluminum nitrate nonahydrate and the thermal stability of the cured polymer—A sample containing 27.12 mg of the phthalonitrile monomer prepared as in Example 15 and 0.68 mg aluminum nitrate nonahydrate (Al(NO$_3$)$_3$.9H$_2$O, 2.4 wt %) was weighed into a TGA pan. The mixture was cured by heating at 200° C. for 4 hours, 300° C. for 2h and 375° C. for 8 h in a nitrogen atmosphere. The thermal stability of the cured polymer as determined by TGA was investigated by heating the cured samples from 25° C. to 1000° C. at 10° C./minute. The cured polymer commenced to lose weight slowly at ~480° C. The high char yield of the cured polymer, 77% after heating to 1000° C., showed that the cured material had excellent thermal stability.

EXAMPLE 69

Curing of phthalonitrile monomer (n=4) in the presence of 1.0 wt % of cuprous bromide and the thermal stability of the cured polymer—A sample containing 25.77 mg of the phthalonitrile monomer prepared as in Example 15 and 0.25 mg cuprous bromide (CuBr, 1.0 wt %) were weighed into a TGA pan. The mixture was cured by heating at 200° C. for 4 hours, 300° C. for 2 h and 375° C. for 8 h in a nitrogen atmosphere. The thermal stability of the cured polymer as determined by TGA was investigated by heating the cured samples from 25° C. to 1000° C. at 10° C./minute. The cured polymer commenced to lose weight slowly at ~480° C. The high char yield of the cured polymer, 73% after heating to 1000° C., showed that the cured material had excellent thermal stability.

EXAMPLE 70

Curing of phthalonitrile monomer (n=4) at 150° C. in the presence of 18 wt % of aluminum nitrate nonahydrate and DSC thermogram to 400° C.—A sample containing 2.61 mg of the phthalonitrile monomer prepared as in Example 15 and 0.49 mg aluminum nitrate nonahydrate (Al(NO$_3$)$_3$.9H$_2$O, 16 wt %) were weighed into a DSC pan. The DSC thermogram from 25° to 400° C. showed and two endothermic transitions at 48° C. and at 76° C. attributed to the phthalonitrile monomer and the metal salt, respectively, and an exothermic transition at 107° C. attributed to the reaction of the metal salt with the phthalonitrile monomer. After the sample was cooled, a second DSC thermogram was obtained from 25° C. to 270° C. The second DSC thermogram showed no transitions. The lack of transitions indicated that no further reaction of the metal salt with the monomer had occurred.

EXAMPLE 71

DSC thermogram of phthalonitrile monomer (n=2) in the presence of 10 wt % cloisite 30A and DSC thermogram to 400° C.—To the phthalonitrile monomer prepared as in Example 14 was added 10 wt % ternary ammonium salt of montmorillonite (available from Southern Clay Products, Inc. under the name Cloisite 30A) in a DSC pan. The DSC thermogram from 25° C. to 400° C. showed an endothermic transition at 51° C. attributed to melting of the phthalonitrile monomer and an exothermic transition at 296° C. attributed to reaction of the amine with the phthalonitrile monomer.

We claim:

1. An aryl-terminated aromatic ether oligomer comprising the formula:

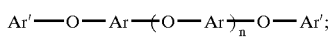

wherein Ar is an independently selected divalent aromatic radical;

wherein Ar' is an independently selected monovalent aromatic radical;

wherein n is an even integer greater than or equal to 2; and wherein n is not equal to 4 when every Ar is m-phenylene and every Ar' is phenyl.

2. The aryl-terminated aromatic ether oligomer of claim 1, wherein the aromatic ether oligomer comprises the formula:

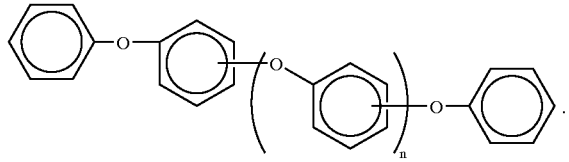

3. A process of preparing an aryl-terminated aromatic ether oligomer comprising the formula:

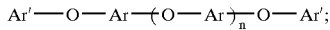

wherein Ar is an independently selected divalent aromatic radical;

wherein Ar' is an independently selected monovalent aromatic radical; and wherein n is an even integer greater than or equal to 2;

comprising the steps of:

reacting a dihydroxyaromatic with a dihaloaromatic to form an aromatic ether oligomer;

wherein either the dihydroxyaromatic or the dihaloaromatic is present in an excess amount; and wherein the reaction is performed in the presence of a copper compound and a base; and reacting the product of the previous step with either a haloaromatic or a hydroxyaromatic;

wherein the haloaromatic is used if the previous step used an excess of dihydroxyaromatic; and wherein the hydroxyaromatic is used if the previous step used an excess of dihaloaromatic.

4. The process of claim 3, wherein the copper compound is selected from the group consisting of CuI and CuBr.

5. The process of claim 3, wherein the dihydroxyaromatic is present in an excess amount; and wherein the haloaromatic is used.

6. The process of claim 3, wherein the aryl-terminated aromatic ether oligomer formed by the process comprises the formula:

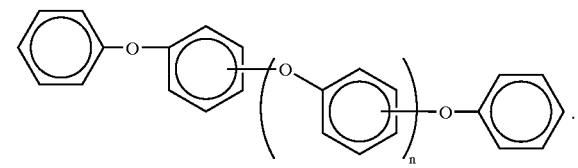

7. The process of claim 3, wherein the base is selected from the group consisting of cesium carbonate and potassium carbonate.

* * * * *